(12) United States Patent
Inoue et al.

(10) Patent No.: US 8,386,583 B2
(45) Date of Patent: Feb. 26, 2013

(54) INFORMATION DISTRIBUTION SYSTEM

(75) Inventors: Takeshi Inoue, Daito (JP); Masahiro Takeshita, Daito (JP); Yuki Higaki, Daito (JP); Koji Imaguchi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 394 days.

(21) Appl. No.: 12/391,636

(22) Filed: Feb. 24, 2009

(65) Prior Publication Data
US 2009/0216830 A1 Aug. 27, 2009

(30) Foreign Application Priority Data

Feb. 26, 2008 (JP) .................... 2008-044470

(51) Int. Cl.
*G06F 15/16* (2006.01)
*G06F 15/173* (2006.01)
(52) U.S. Cl. ......... 709/217; 709/223; 709/225; 709/226
(58) Field of Classification Search .................. 709/217, 709/223, 225, 226
See application file for complete search history.

(56) References Cited

U.S. PATENT DOCUMENTS

| | | | |
|---|---|---|---|
| 2004/0064568 A1* | 4/2004 | Arora et al. .................. | 709/228 |
| 2007/0005743 A1 | 1/2007 | Herzog | |
| 2007/0237139 A1* | 10/2007 | Garcia-Martin et al. ..... | 370/389 |
| 2008/0066082 A1* | 3/2008 | Choi .............................. | 719/318 |
| 2008/0141275 A1* | 6/2008 | Borgendale et al. .......... | 719/313 |
| 2010/0094952 A1* | 4/2010 | Lindgren et al. .............. | 709/219 |

FOREIGN PATENT DOCUMENTS

| | | |
|---|---|---|
| EP | 1 657 939 A1 | 5/2006 |
| EP | 1657939 A1 * | 5/2006 |
| JP | 11-308599 A | 11/1999 |
| JP | 2004-206328 A | 7/2004 |
| JP | 2004-363711 A | 12/2004 |
| JP | 2006-100978 A | 4/2006 |

OTHER PUBLICATIONS

Verma P. et al: "Internet Emergency Alert System", Military Communications Conference. MILCOM 2005. IEEE Atlantic City, NJ, USA Oct. 17-20, 2005, pp. 1-7.
European Search Report dated Jul. 20, 2009 with English translation (nine (9) pages).

* cited by examiner

*Primary Examiner* — Karen Tang
(74) *Attorney, Agent, or Firm* — Crowell & Moring LLP

(57) ABSTRACT

Disclosed is an information distribution system including: a SIP server; and a plurality of terminals registered to the SIP server, wherein the plurality of terminals are composed of: a distribution source terminal; and a distribution destination terminal, the SIP server includes: a storage section to store terminal information; an obtaining section to obtain terminal information of a distribution destination terminal; a producing section to produce the distribution destination information; and a sending section to send distribution destination information to the distribution source terminal, the distribution source terminal includes: a requesting section to request to send the distribution destination information; and a distributing section to connect to the distribution destination terminal and to distribute the predetermined information by peer-to-peer communication, the requesting section sends the predetermined information to the SIP server, and the sending section sends the distribution destination information and the predetermined information.

8 Claims, 13 Drawing Sheets

FIG.4

| | | | TERMINAL INFORMATION | | | SUB-TERMINAL INFORMATION | EMERGENCY CONTACT INFORMATION | ... | REGISTRATION VALID DURATION |
|---|---|---|---|---|---|---|---|---|---|
| | | | URI | IP ADDRESS | LOCATION INFORMATION | | | | |
| X CITY GROUP | Y TOWN GROUP | FIRST BLOCK GROUP | sip:AAA@** | 192.168.1.100 | X CITY, Y TOWN, FIRST BLOCK, 1-1 | 090--** | / | ... | VALID |
| | | | ... | ... | ... | ... | ... | ... | ... |
| | | SECOND BLOCK GROUP | sip:BBB@** | 192.168.1.200 | X CITY, Y TOWN, SECOND BLOCK, 1-3 | / | 03--** | ... | INVALID |
| | | | ... | ... | ... | ... | ... | ... | ... |
| | | ... | ... | ... | ... | ... | ... | ... | ... |
| | ... | | ... | ... | ... | ... | ... | ... | ... |
| ... | | | ... | ... | ... | ... | ... | ... | ... |

12

INFORMATION DISTRIBUTION SYSTEM

BACKGROUND OF THE INVENTION

1. Field of the Invention

The present invention relates to an information distribution system.

2. Description of Related Art

Conventionally, there is known an information distribution system including an information management server and a terminal connected to the server where the server can distribute to the terminal emergency information to inform a disaster or incident which occurred.

Specifically, for example, an information management server (controlling base station) which can select/extract the terminal (information receiving section) of the distribution destination to which the emergency information is to be distributed, and which can distribute the emergency information to the selected/extracted terminal, or an information management server (IP telephone connection apparatus) which can send a message of the emergency information to a pre-registered e-mail address linked with the distribution to the terminal are proposed for the information distribution system (for example, see Japanese Patent Application Laid-Open Publication No. 2006-100978 and Japanese Patent Application Laid-Open Publication No. 2004-363711).

Also, a method is proposed where a plurality of terminals are divided into a plurality of groups and communication frequency band is changed between communication within each group and communication among the groups (for example, see Japanese Patent Application Laid-Open Publication No. H11-308599).

Also an information distribution system is proposed where measuring instruments such as an emergency bell, security door sensor, or security sensor can detect an occurrence of disaster or incident (for example, see Japanese Patent Application Laid-Open Publication No. 2004-206328).

However, as for the invention shown in Japanese Patent Application Laid-Open Publication No. 2006-100978 and Japanese Patent Application Laid-Open Publication No. 2004-363711, since the information management server distributes the emergency information to each terminal, the information management server is essential to the system and there is a problem of a burden of cost when the system is constructed. Also, since the information management server manages and distributes the information, there is a problem that the server is burdened.

Also, as for the invention shown in Japanese Patent Application Laid-Open Publication No. H11-308599 and Japanese Patent Application Laid-Open Publication No. 2004-206328, the problems of a burden of cost when the system is constructed and a burden on the server cannot be solved.

SUMMARY OF THE INVENTION

It is, therefore, a main object of the present invention to provide an information distribution system to distribute information reliably and with high speed which can reduce a burden of cost of system construction and burden of the server.

According to a first aspect of the present invention, there is provided an information distribution system including:
a Session Initiation Protocol (SIP) server; and
a plurality of terminals registered to the SIP server, wherein the plurality of terminals are composed of:
a distribution source terminal to distribute predetermined information; and
a distribution destination terminal to which the predetermined information is distributed,
the SIP server includes:
a storage section to store terminal information concerning the terminal;
an obtaining section to obtain terminal information of a terminal which is to be the distribution destination terminal from terminal information stored in the storage section when the distribution source terminal requests distribution destination information concerning the distribution destination terminal to be sent;
a producing section to produce the distribution destination information based on the terminal information obtained by the obtaining section; and
a sending section to send distribution destination information produced by the producing section to the distribution source terminal,
the distribution source terminal includes:
a requesting section to request to the SIP server to send the distribution destination information; and
a distributing section to connect to the distribution destination terminal based on the distribution destination information sent from the sending section and to distribute the predetermined information to the distribution destination terminal by peer-to-peer communication,
the distribution source terminal is composed of:
a first distribution source terminal including the requesting section and the distributing section; and
a second distribution source terminal including the distributing section;
the requesting section sends the predetermined information to the SIP server when the requesting section requests to the SIP server to send the distribution destination information, and
the sending section sends the distribution destination information and the predetermined information sent by the requesting section to the first distribution source terminal and/or the second distribution source terminal.

According to a second aspect of the present invention, there is provided an information distribution system including:
a Session Initiation Protocol (SIP) server; and
a plurality of terminals registered to the SIP server, wherein the plurality of terminals are composed of:
a distribution source terminal to distribute predetermined information; and
a distribution destination terminal to which the predetermined information is distributed,
the SIP server includes:
a storage section to store terminal information concerning the terminal;
an obtaining section to obtain terminal information of a terminal which is to be the distribution destination terminal from terminal information stored in the storage section when the distribution source terminal requests distribution destination information concerning the distribution destination terminal to be sent;
a producing section to produce the distribution destination information based on the terminal information obtained by the obtaining section;
a sending section to send distribution destination information produced by the producing section to the distribution source terminal; and
a setting section to set a priority order for distributing the predetermined information to the distribution destination terminal based on a plurality of pieces of terminal information when there are the plurality of pieces of terminal information obtained by the obtaining section;

the producing section produces the distribution destination information including assignment information to assign, with respect to each terminal, terminal information of other distribution destination terminal to which the distribution destination terminal distributes the predetermined information so that the predetermined information is distributed according to the priority order set by the setting section;

the distribution source terminal includes:
a requesting section to request to the SIP server to send the distribution destination information; and
a distributing section to connect to the distribution destination terminal based on the distribution destination information sent from the sending section and to distribute the predetermined information to the distribution destination terminal by peer-to-peer communication, the distributing section distributes the predetermined information and the distribution destination information to the distribution destination terminal first in the priority order set by the setting section based on the distribution destination information sent by the sending section;

the distribution destination terminal includes:
an extracting section to extract assignment information for the distribution destination terminal from the distribution destination information distributed from the distributing section or other distribution destination terminal;
a second distributing section to distribute the predetermined information and the distribution destination information by peer-to-peer communication to other distribution destination terminal based on the terminal information assigned to the distribution destination terminal based on the assignment information extracted by the extracting section; and
a second producing section to delete assignment information for the distribution destination terminal extracted by the extracting section from the distribution destination information distributed by the distributing section or the second distributing section of other distribution destination terminal to produce new distribution destination information, the second distributing section distributes the predetermined information and the distribution destination information produced by the second producing section.

the distribution source terminal is composed of:
a first distribution source terminal including the requesting section and the distributing section; and
a second distribution source terminal including the distributing section;

the requesting section sends the predetermined information to the SIP server when the requesting section requests to the SIP server to send the distribution destination information, and the sending section sends the distribution destination information and the predetermined information sent by the requesting section to the first distribution source terminal and/or the second distribution source terminal.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIG. 4 is a diagram showing data structure of a memory section shown in FIG. 3;

DESCRIPTION OF THE PREFERRED EMBODIMENTS

The best mode for carrying out the information distribution system according to the present invention will be explained in detail with reference to the drawings. However, the scope of the invention is not limited to the illustrated examples.

<Information Distribution System>

Figure 1:
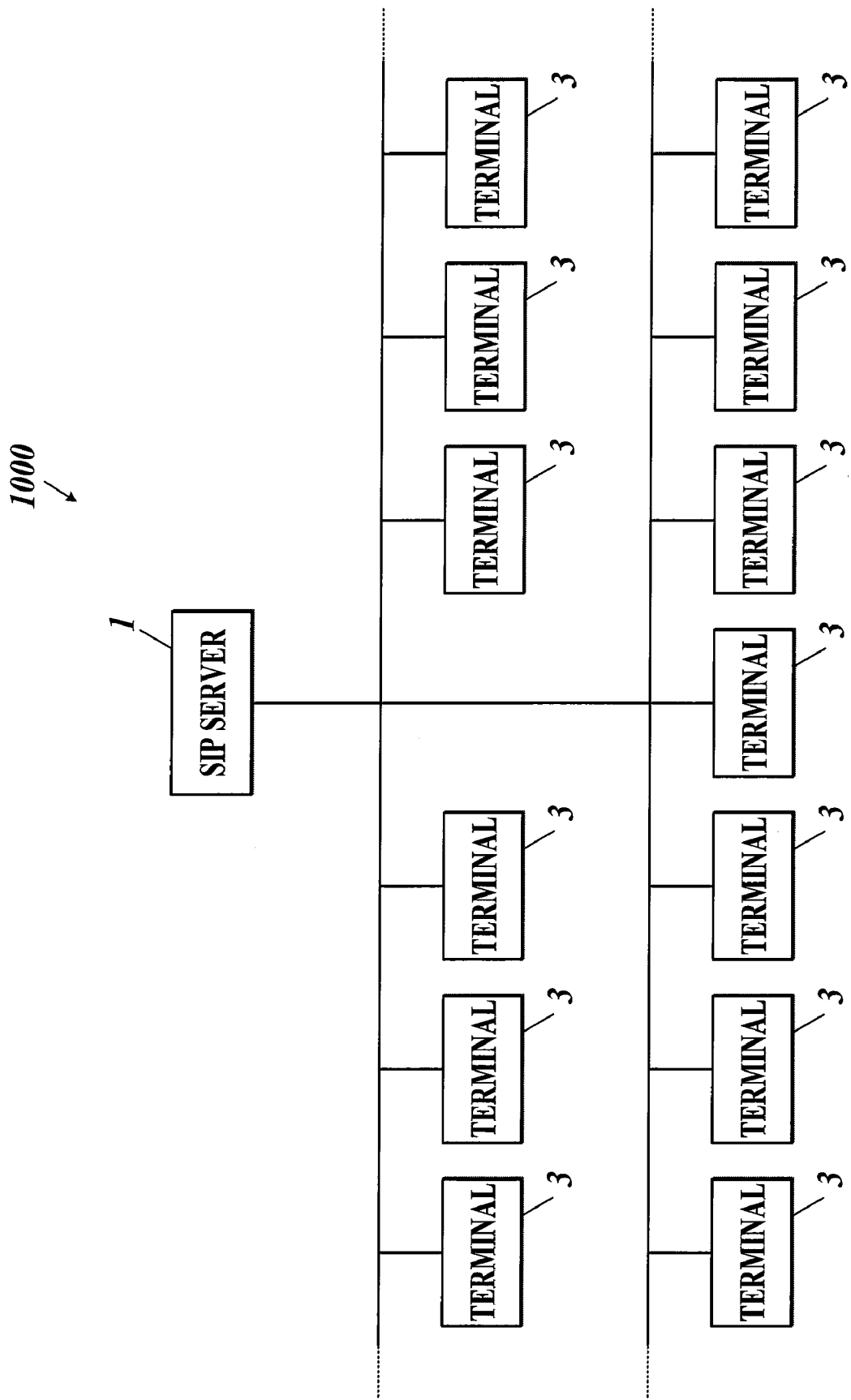
FIG. 1 is a block diagram showing a structure of an information distribution system according to the present embodiment.

As shown in FIG. 1, an information distribution system 1000 of the present embodiment includes, for example, a Session Initiation Protocol (SIP) server 1 placed on a global network, a plurality of terminals 3 connected to the global network to connect to the SIP server 1 through the global network, etc.

Here, for example, the terminal 3 registers terminal information concerning the terminal 3 to the SIP sever 1 when connected to the global network, and can be connected to the SIP server 1 while registered to the SIP server 1 (during registration valid duration).

For example, when the terminal information (location information included in the terminal information, etc.) is changed by the terminal 3 being moved, etc., the terminal 3 registers (reregisters) the changed terminal information to the SIP sever 1. Also, the registration valid duration of the registration to the SIP server 1 is fixed, therefore, the terminal 3 registers (reregisters) the terminal information to the SIP server 1 before the registration valid duration expires.

Also, for example, the terminal 3 functions as a distribution source terminal when the terminal distributes emergency information as predetermined information and the terminal 3 functions as a distribution destination terminal when emergency information is distributed to the terminal.

Here, emergency information is, for example, information concerning a disaster such as fire disaster, earthquake, flood, etc., incident (crime) such as breaking and entering, building vandalizing, etc.

Figure 2:
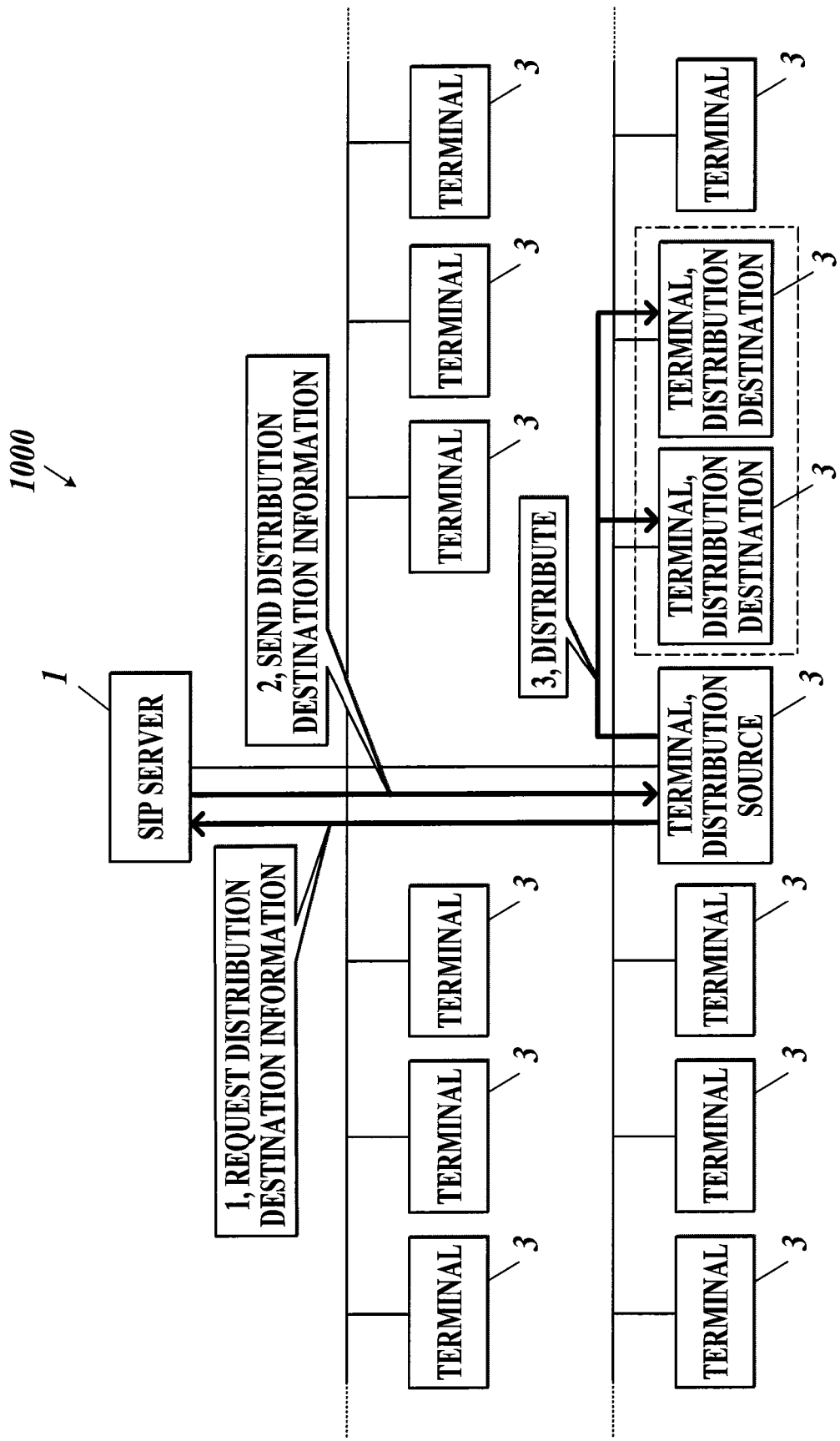
FIG. 2 is a diagram showing a flow of information distribution by the information distribution system according to the present embodiment.

In the information distribution system 1000, for example, as shown in FIG. 2, (1) the distribution source terminal sends to the SIP server 1 emergency information to be distributed and requests to the SIP server 1 to send distribution destination information concerning the distribution destination terminal to which the emergency information is to be sent, (2) according to the request, the SIP server 1 sends the distribution destination information and the sent emergency information to the distribution source terminal, and (3) the distribution source terminal establishes a session with the distribution destination terminal based on the sent distribution destination information to distribute the sent emergency information by peer-to-peer communication to the distribution destination terminal.

Here, the distribution destination information is information concerning the distribution destination terminal (for example, terminals 3 boxed with an alternate long and short dash line shown in FIG. 2) which the SIP server 1 selected from a plurality of terminals 3 according to, for example, location of the distribution source terminal, type of distributed emergency information, etc.

Figure 12:
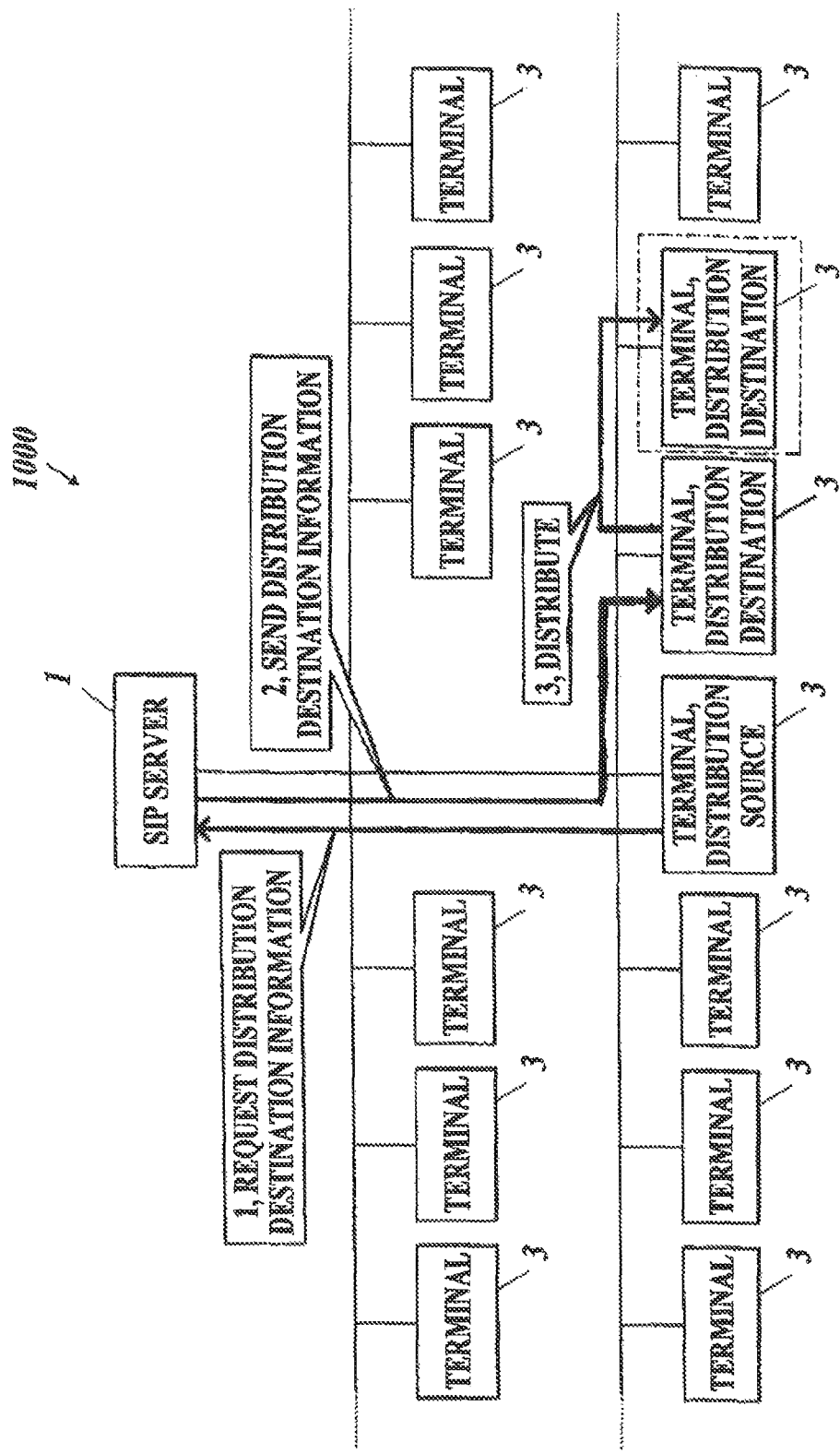
FIG. 12 is a diagram showing a flow of information distribution by the information distribution system according to an exemplary embodiment of the present invention.
Figure 13:
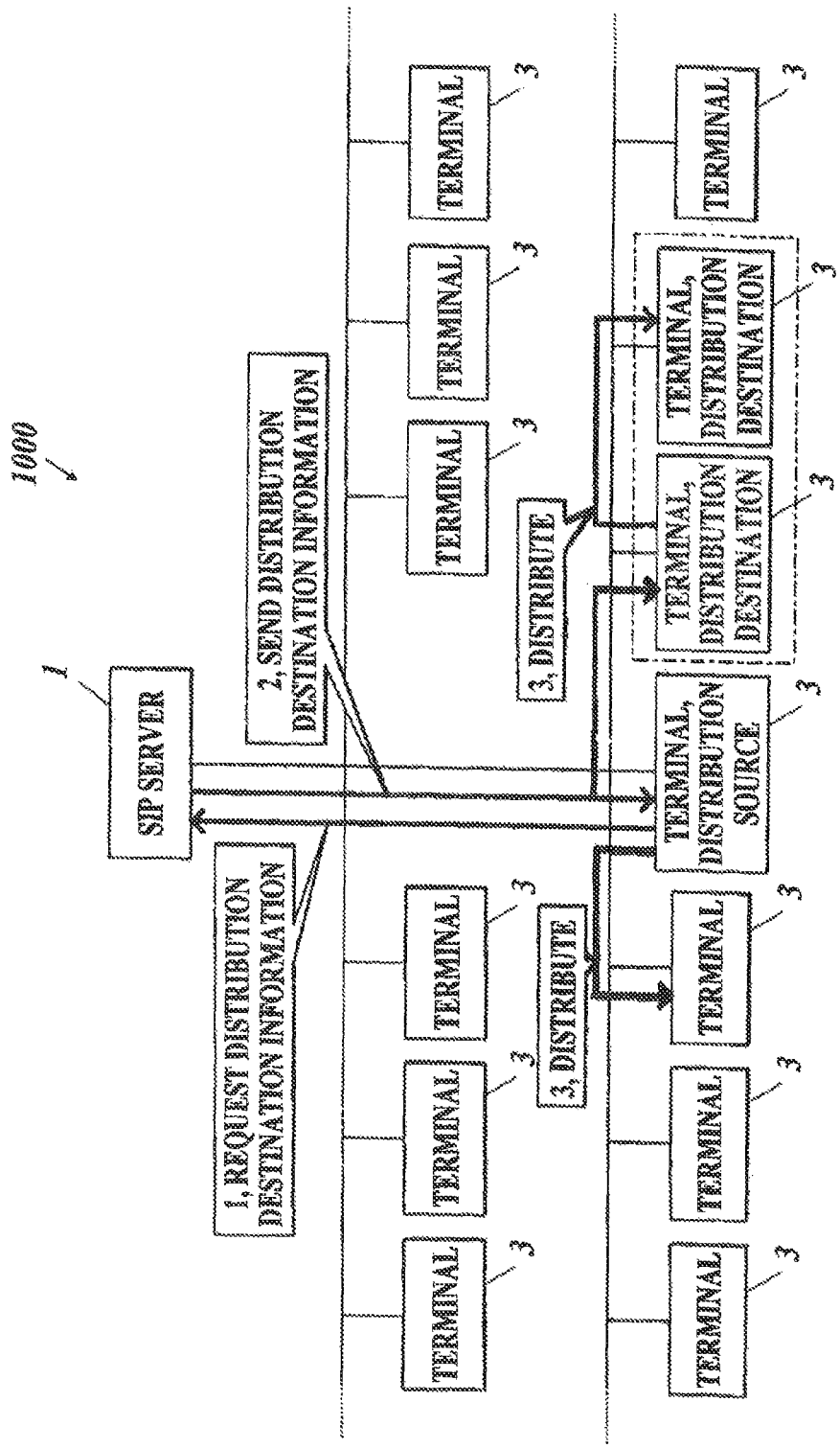
FIG. 13 is a diagram showing a flow of information distribution by the information distribution system according to another exemplary embodiment of the present invention.

Incidentally, in FIG. 2, the distribution source terminal which requested sending of the distribution destination information distributes the emergency information, however, the distribution source terminal to distribute emergency information can be the terminal (first distribution source terminal) which requested the distribution destination information to be sent or a terminal (second distribution source terminal) which did not request the distribution destination information to be sent (as illustrated in FIGS. 12 and 13).

<SIP Server>

The SIP server 1, for example, is placed on a global network which is a communication network such as the internet, WAN, etc., and functions as, for example, proxy server, redirect server, registrar, location server, etc.

Figure 3:
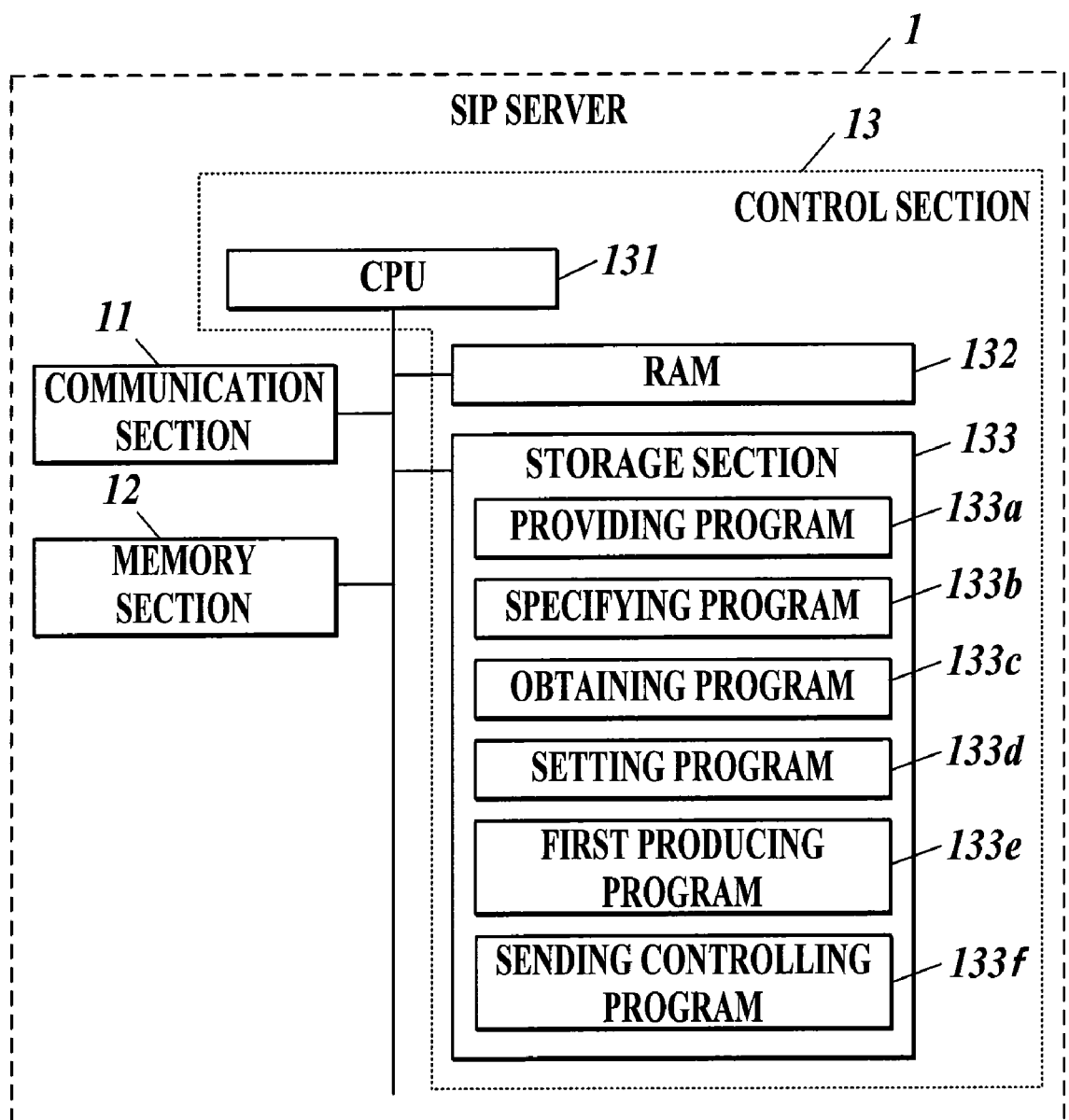
FIG. 3 is a block diagram showing a functional structure of a SIP server shown in FIG. 1.

As shown in FIG. 3, the SIP server 1 includes, for example, a communication section 11, memory section 12, control section 13, etc.

The communication section 11, for example, sends and receives various pieces of data between the terminal 3 through the global network.

Specifically, for example, the communication section 11 receives emergency information sent from the distribution source terminal (first distribution source terminal) and receives a request from the distribution source terminal (first distribution source terminal) for distribution destination information to be sent.

Also, the communication section 11, for example, functions as a sending section, and according to a control signal input from the control section 13, sends to the distribution source terminal (first distribution source terminal and/or second distribution source terminal) distribution destination information produced by the control section 13 and emergency information sent from the distribution source terminal (first distribution source terminal).

The memory section 12, for example, functions as a storage section, and according to a control signal input from the control section 13, stores terminal information concerning the terminal 3, sub-terminal information concerning the sub-terminal whose main terminal is the terminal 3, emergency contact information concerning emergency contact corresponding to the terminal 3, etc. associated to each other.

Specifically, for example, as shown in FIG. 4, the terminal information is information including, Uniform Resource Identifier (URI) of the terminal 3, Internet Protocol (IP) Address of the terminal 3, location information concerning the location of the terminal 3, etc.

Incidentally, when the terminal 3 (main terminal) is, for example, a mobile terminal such as a cellular phone, etc., the location information included in the terminal information is location information concerning the location of access point to which the terminal 3 accesses when connecting to the SIP server 1. In other words, when the terminal 3 (main terminal) is a mobile terminal, the terminal 3 obtains location information concerning the location of the access point from the access point to which the terminal 3 accesses and registers the terminal information including the location information to the SIP server 1.

Here, a sub-terminal is, for example, an apparatus other than the terminal 3 owned by a user which is specified by the user of the terminal 3. Specifically, for example, when the terminal 3 (main terminal) is a fixed apparatus fixed indoors, the sub-terminal is a mobile apparatus which can be taken outdoors.

The sub-terminal information is, for example, information used when communicating with the sub-terminal. Specifically, for example, when the sub-terminal is a cellular phone, the sub-terminal information is phone number, e-mail address, etc. of the cellular phone.

For example, when the user of the terminal 3 notifies the sub-terminal information to the SIP server 1, the sub-terminal information is stored in the memory section 12 associated with the terminal information of the terminal 3.

Also, emergency contact is, for example, contact of someone other than the user specified by the user of the terminal 3. Specifically, emergency contact is, for example, contact of the user's relative, etc.

Emergency contact information is, for example, information used when contacting someone other than the user specified by the user of the terminal 3. Specifically, for example, emergency contact information is telephone number, facsimile number, e-mail address, etc. of the user's relative, etc.

For example, when the user of the terminal 3 notifies the emergency contact information to the SIP server 1, the emergency contact information is stored in the memory section 12 associated with the terminal information of the terminal 3.

Each piece of terminal information stored in the memory section 12 is grouped based on location information included in the terminal information.

Specifically, for example, as shown in FIG. 4, each terminal information is grouped according to a predetermined area such as "X city group", "(X city) Y town group", "(X city Y town) first block group", "(X city Y town) second block group". Incidentally, method of grouping can be done freely, for example, grouping can be done in a larger category (for example according to prefecture) or a smaller category (for example, according to house number).

Also, each piece of terminal information stored in the memory section 12 is provided with information to identify terminal information of terminal 3 whose registration valid duration has not expired and terminal information of terminal 3 whose registration valid duration has expired (terminal information of terminal 3 who has not reregistered after the registration valid duration has expired).

Specifically, for example, as shown in FIG. 4, terminal information of terminal 3 whose registration valid duration has not expired is provided with "registration valid duration:

valid" and terminal information of terminal 3 whose registration valid duration has expired is provided with "registration valid duration: invalid".

As shown in FIG. 2, the control section 13 includes, for example, a Central Processing Unit (CPU) 131, Random Access Memory (RAM) 132, storage section 133, etc.

The CPU 131 for example, performs various control operation according to various processing programs for the SIP server 1 stored in the storage section 133.

The RAM 132 includes, for example, a program storage area to expand a processing program performed by the CPU 131, data storage area to store input data, processing result when the above-described processing program is performed, etc.

The storage section 133 for example, stores a system program which can be performed by the SIP server 1, various processing programs which can be performed by the system program, data used when these various processing programs are performed, data of processing result of arithmetic processing by the CPU 131, etc. The program is stored in the storage section 133 in a format of a program code readable by a computer.

Specifically, the storage section 133 stores, for example, a providing program 133*a*, specifying program 133*b*, obtaining program 133*c*, setting program 133*d*, first producing program 133*e*, sending controlling program 133*f*, etc.

The providing program 133*a*, for example, allows the CPU 131 to realize a function to provide port information (for example, port number, etc.) concerning a port for multicast communication to the terminal 3 registered to the SIP server 1.

By performing the providing program 133*a*, the CPU 131 functions as a providing section.

The specifying program 133*b*, for example, allows the CPU 131 to realize a function to specify a group of the terminal 3 to be the distribution destination terminal according to location of the distribution source terminal (first distribution source terminal) which requested distribution destination information, type of emergency information distributed, etc.

Specifically, when the emergency information is, for example, information concerning a fire disaster, a group to which the terminal 3 within the area (for example, within a same block of the block where the distribution source terminal (first distribution source terminal) is located) influenced by the fire disaster belongs is specified. More specifically, for example, when the distribution source terminal (first distribution source terminal) which distributes the emergency information concerning the fire disaster is located in "X city Y town first block", the CPU 131 specifies, for example, "(X city Y town) first block group".

Also, when the emergency information is, for example, information concerning breaking and entering, a group to which the terminal 3 within the area (for example, within a same town of the town where the distribution source terminal (first distribution source terminal) is located) influenced by the breaking and entering belongs is specified. More specifically, for example, when the distribution source terminal (first distribution source terminal) which distributes the emergency information concerning the breaking and entering is located in "X city Y town", the CPU 131 specifies, for example, "(X city) Y town group".

Also, when the emergency information is, for example, information concerning an earthquake, a group to which the terminal 3 within the area (for example, within a same city of the city where the distribution source terminal (first distribution source terminal) is located) influenced by the earthquake belongs is specified. More specifically, for example, when the distribution source terminal (first distribution source terminal) which distributes the emergency information concerning the earthquake is located in "X city", the CPU 131 specifies, for example, "X city group".

By performing the specifying program 133*b*, the CPU 131 functions as a specifying section.

The obtaining program 133*c*, for example, allows the CPU 131 to realize a function to obtain terminal information of the terminal 3 to be the distribution destination terminal from the terminal information stored in the memory section 12 when the distribution source terminal (first distribution source terminal) requests distribution destination information concerning the distribution destination terminal to be sent.

Here, the terminal 3 which is to be the distribution destination terminal is, for example the terminal 3 which belongs to the group specified by the CPU 131 performing the specifying program 133*b*.

Also, when the type of the emergency information to be distributed is a predetermined type, the CPU 131 obtains the emergency contact information of the emergency contact corresponding to the terminal 3 belonging to the group specified by the CPU 131 when the specifying program 133*b* is performed.

A predetermined type is, for example, information concerning an earthquake, etc., which is a type where it is preferable that someone other than the user (user's relative, etc.) specified by the user of the terminal 3 is also notified.

Therefore, when the emergency information is a predetermined type (for example, a type where it is preferable that someone other than the user specified by the user of the terminal 3 is notified, etc.), the CPU 131 obtains from the memory section 12 terminal information of the terminal 3 belonging to the group specified by the CPU 131 performing the specifying program 133*b* and the emergency contact information corresponding to the terminal information.

Also, the CPU 131, for example, obtains from the memory section 12 terminal information of the terminal 3 which is to be the distribution destination terminal and/or the sub-terminal information concerning a sub-terminal whose main terminal is the terminal 3.

Specifically, for example, when terminal information of a terminal 3 which is not presently connected to the SIP server 1 is included in the obtained terminal information, in other words, when terminal information of a terminal 3 whose registration valid duration has expired (terminal information provided with "registration valid duration: invalid" in the terminal information stored in the memory section 12) is included in the obtained terminal information, the CPU 131 obtains the sub-terminal information of the sub-terminal whose main terminal is the terminal 3 not connected to the SIP server 1.

Here, since the terminal 3 not presently connected to the SIP server 1 cannot establish a session with other terminal 3, emergency information cannot be distributed to the terminal 3 not presently connected to the SIP server 1, however by obtaining sub-terminal information corresponding to the terminal information of the terminal 3, emergency information can be distributed by telephone, facsimile, e-mail, etc. to the sub-terminal whose main terminal is the terminal 3.

By performing the obtaining program 133*c*, the CPU 131 functions as an obtaining section.

For example, when there are a plurality of pieces of terminal information obtained by the CPU 131 performing the obtaining program 133*c*, the setting program 133*d*, allows the CPU 131 to enable a function to set, based on the plurality of pieces of terminal information, a priority order of the distribution destination terminal to be distributed with the emergency information.

Specifically, for example, the CPU 131 sets the priority order based on registration frequency, idle calling time, circuit quality, circuit band, processing capability, the number of establishable sessions, usage frequency, type of emergency information, etc.

Setting priority order based on registration frequency is done by, for example, storing frequency of registration (re-registration) of each terminal 3 and setting priority order so that the terminal 3 with the higher frequency of registration (re-registration) to the SIP server 1 is in the higher order.

Setting priority order based on idle calling time is done by, for example, storing the idle calling time of each terminal 3 and setting the priority order so that the terminal 3 with the longer idle calling time is in the higher order.

Setting priority order based on circuit quality or circuit band is done by, for example, storing circuit quality or circuit band of each terminal 3 and setting the priority order so that the terminal 3 with more free capacity of the circuit is in the higher order.

Setting priority order based on processing capability is done by, for example, storing the processing capability of each terminal 3 and setting the priority order so that the terminal 3 with the higher processing capability is in the higher order.

Setting priority order based on the number of establishable sessions is done by, for example, storing the establishable sessions of each terminal 3 and setting the priority order so that the terminal 3 with the higher number of establishable sessions is in the higher order.

Here, when there is a distribution destination terminal which cannot establish a session among the distribution destination terminals, the emergency information is not distributed to the distribution destination terminal, and there is a case where the emergency information is not distributed to the distribution destination terminal with a lower priority order than the distribution destination terminal. Therefore, for example, by setting the priority order based on registration frequency, idle calling time, circuit quality, circuit band, processing capability, number of establishable sessions, etc. so that emergency information can be distributed preferentially from the terminal 3 with a high possibility of being able to establish a session for distribution of emergency information, emergency information can be distributed to as many distribution destination terminals as possible.

Setting the priority order based on usage frequency is done by, for example, storing the usage frequency of each terminal 3 and setting the priority order so that the terminal 3 more frequently used by the user is in the higher order.

Here, the distributed emergency information is of no use if the user does not see or hear it. Therefore, for example, by setting the priority order based on the usage frequency, the emergency information can be distributed preferentially to the terminal 3 with a high possibility that the user sees or hears the distributed emergency information.

Setting the priority order based on type of emergency information is done by, for example, setting the priority order so that the terminal 3 which receives the higher influence of the fire disaster or incident is in the higher priority order.

Here, for example, when the type of emergency information is a fire disaster, the emergency information needs to be distributed from the distribution destination terminal in a close distance from the fire disaster source, otherwise there is a possibility the user fails to escape. Also, there is a case where the distribution destination terminal stops operation, etc. due to the influence of the fire disaster, and the emergency information is not distributed to this distribution destination terminal or the distribution destination terminal with a lower priority order than this distribution destination terminal. Therefore, for example, by setting the priority order based on the type of emergency information, such problems occurring can be prevented.

By performing the setting program 133*d*, the CPU 131 functions as a setting section.

The first producing program 133*e*, for example, allows the CPU 131 to realize a function to produce, for example, distribution destination information including IP address included in the obtained terminal information, port information (for example, port number, etc.) concerning the port used by the terminal 3 based on the obtained terminal information or the like based on the terminal information obtained by the CPU 131 by performing the obtaining program 133*c*.

Specifically, the distribution destination information, for example, includes assignment information, etc. to assign, with respect to each distribution destination terminal, terminal information (IP address, port information concerning the port used, etc.) of other distribution destination terminal to which the distribution destination terminal distributes emergency information so that emergency information is distributed to all distribution destination terminals according to the priority order set by the CPU 131 when the setting program 133*d* is performed.

The distribution destination information (assignment information) is, for example, meta-information.

Figure 5:
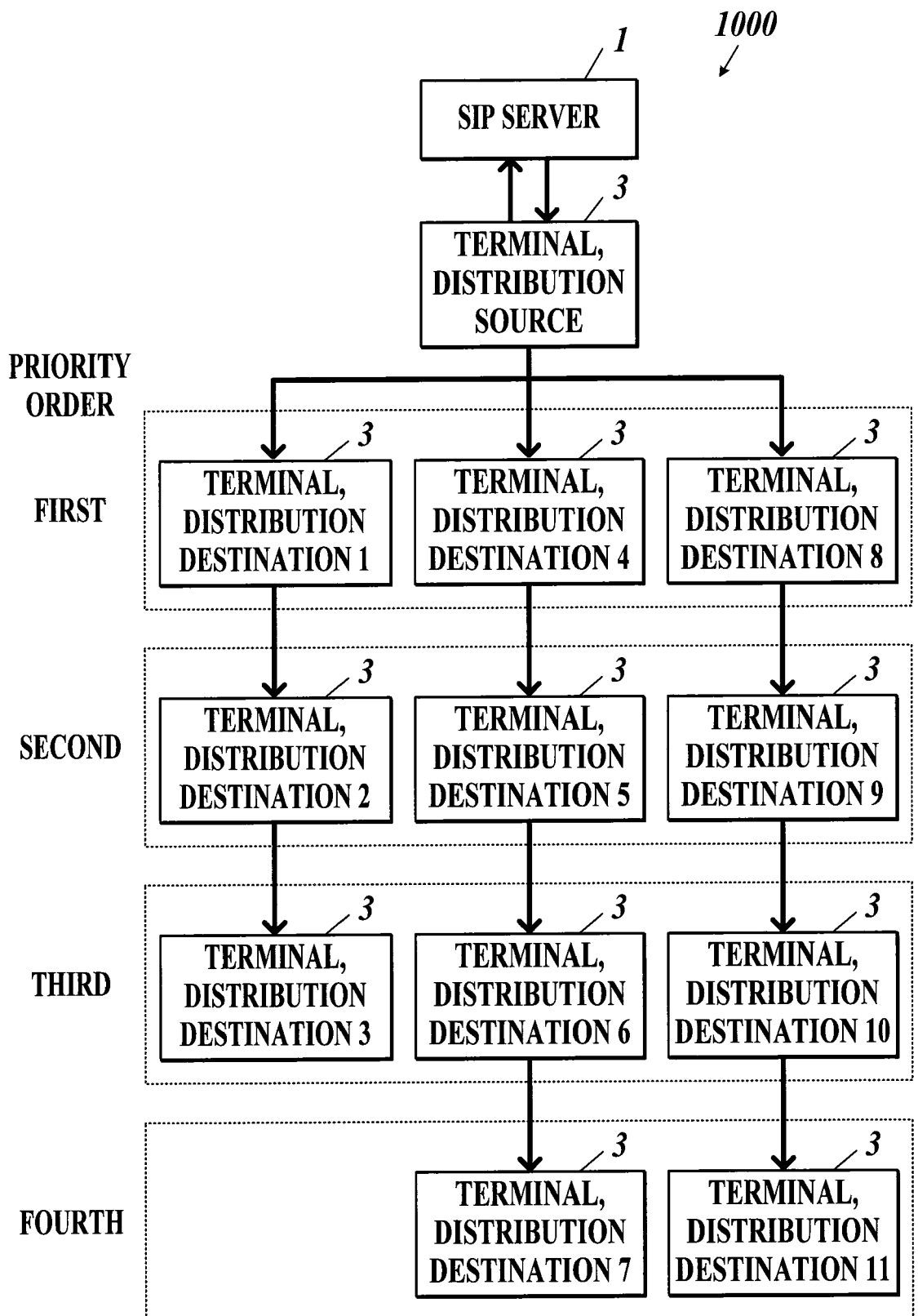
FIG. 5 is a block diagram showing an example of how to distribute information according to a priority order.

For example, as shown in FIG. 5, when the number of distribution destination terminals assigned to each priority order is substantially the same number, the CPU 131 produces the assignment information, with respect to distribution destination terminal, to assign the terminal information of other distribution destination terminals by setting the number of other distribution destination terminals as one terminal.

In other words, for example, when emergency information is transmitted in a horizontal form as shown in FIG. 5, the assignment information included in the distribution destination information includes, assignment information for the distribution destination terminal of "distribution destination 1" assigning terminal information of the distribution destination terminal of "distribution destination 2" to the distribution destination terminal of "distribution destination 1", assignment information for the distribution destination terminal of "distribution destination 2" assigning terminal information of the distribution destination terminal of "distribution destination 3" to the distribution destination terminal of "distribution destination 2", assignment information for the distribution destination terminal of "distribution destination 4" assigning terminal information of the distribution destination terminal of "distribution destination 5" to the distribution destination terminal of "distribution destination 4", assignment information for the distribution destination terminal of "distribution destination 5" assigning terminal information of the distribution destination terminal of "distribution destination 6" to the distribution destination terminal of "distribution destination 5", assignment information for the distribution destination terminal of "distribution destination 6" assigning terminal information of the distribution destination terminal of "distribution destination 7" to the distribution destination terminal of "distribution destination 6", assignment information for the distribution destination terminal of "distribution destination 8" assigning terminal information of the distribution destination terminal of "distribution destination 9" to the distribution destination terminal of "distribution destination 8", assignment information for the distribution destination terminal of "distribution destination 9" assigning terminal information of the distribution destination terminal of "distribution destination 10" to the distribution destination terminal of "distribution destination 9", assignment information for the distribution destination terminal of "distribution destination 10" assigning terminal information of the distribution destination terminal of "distribution destination 11" to the distribution destination terminal of "distribution destination 10".

Figure 6:
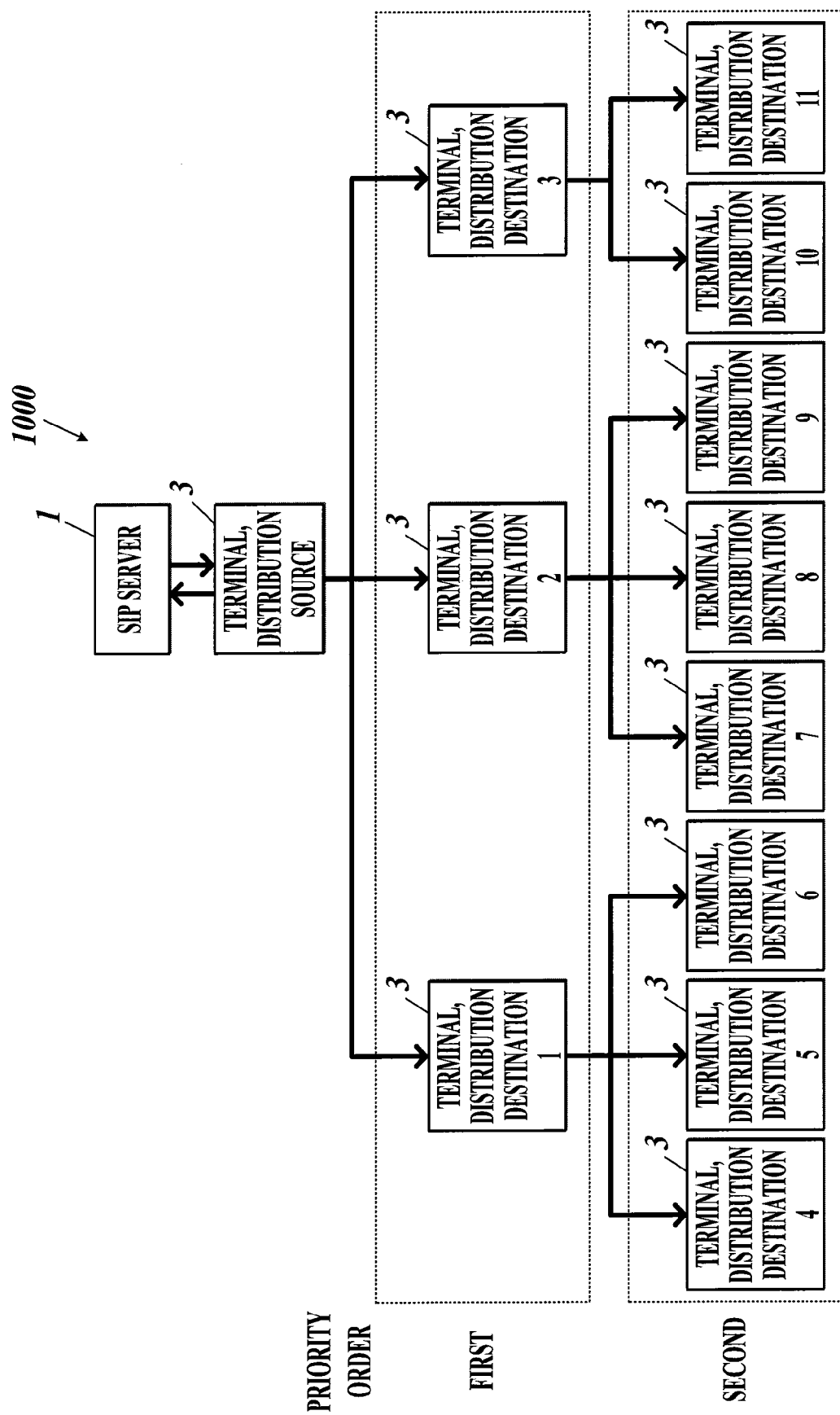
FIG. 6 is a block diagram showing another example of how to distribute information according to a priority order.

Also, for example, as shown in FIG. 6, when the number of distribution destination terminals assigned to each priority order becomes larger as the priority order becomes lower, the CPU 131 produces the assignment information, with respect to each distribution destination terminal, to assign the terminal information of other distribution destination terminals by setting the number of other distribution destination terminals as a plurality of terminals.

In other words, for example, when emergency information is transmitted in a cascade form as shown in FIG. 6, the assignment information included in the distribution destination information includes, assignment information for the distribution destination terminal of "distribution destination 1" assigning terminal information of the distribution destination terminal of "distribution destination 4", "distribution destination 5" and "distribution destination 6" to the distribution destination terminal of "distribution destination 1", assignment information for the distribution destination terminal of "distribution destination 2" assigning terminal information of the distribution destination terminal of "distribution destination 7", "distribution destination 8" and "distribution destination 9" to the distribution destination terminal of "distribution destination 2", and assignment information for the distribution destination terminal of "distribution destination 3" assigning terminal information of the distribution destination terminal of "distribution destination 10" and "distribution destination 11" to the distribution destination terminal of "distribution destination 3".

Here, for example, when the sub-terminal information is obtained by the CPU 131 performing the obtaining program 133c, the CPU 131 produces the distribution destination information based on the obtained sub-terminal information.

In other words, for example, when the sub-terminal information of the sub-terminal whose main terminal is the terminal 3 is obtained, the CPU 131 produces distribution destination information including the obtained sub-terminal information in addition to or instead of the terminal information (IP address, port information concerning the port used, etc.) of the terminal 3.

Since the sub-terminal cannot distribute emergency information to other distribution destination terminal by peer-to-peer communication, it is preferable that the priority order of the sub-terminal is lowest. Therefore, when the priority order is set by the CPU 131 by performing the setting program 133d, in a case where the sub-terminal is the distribution destination terminal (in other words, when sub-terminal information is obtained), the priority order of the sub-terminal should be lowest.

By performing the first producing program 133e, the CPU 131 functions as a producing section.

The sending controlling program 133f, for example, allows the CPU 131 to realize a function to input a control signal to the communication section 11 to send to the distribution source terminal (first distribution source terminal and/or second distribution source terminal) distribution destination information produced by the CPU 131 performing the first production program 133e and the emergency information sent from the distribution source terminal (first distribution source terminal) requesting the distribution destination information to be sent.

Specifically, the CPU 131 selects whether the first distribution source terminal, the first distribution source terminal and the second distribution source terminal or the second distribution source terminal is to be the distribution source terminal according to the type of the distributed emergency information, the number of distribution destination terminals, etc.

In other words, when a type of emergency information is not a certain type or a number of the distribution destination terminals is smaller than a predetermined threshold value, the CPU 131 selects the first distribution source terminal as the distribution source terminal. When the type of emergency information is a certain type (for example, a type where there is a possibility that the first distribution source terminal stops, etc., due to the influence of the occurred disaster or incident, or the like), the CPU 131, for example, selects the second distribution source terminal as the distribution source terminal. Also, when the type of emergency information is a certain type (for example, a type where the emergency information needs to be transmitted even faster, or the like), the number of distribution destination terminals is a predetermined threshold value or more (for example, the number of distribution destination terminals is large that transmission of emergency information takes time), or the like, the CPU 131, for example, selects the first distribution source terminal and the second distribution source terminal as the distribution source terminal.

Incidentally, the CPU 131 selects the terminal 3 to be the second distribution source terminal from the terminals 3 based on, for example, registration frequency, idle calling time, circuit quality, circuit band, processing capability, number of establishable sessions, usage frequency, type of emergency information, etc.

<Terminal>

The terminal 3, for example, is a communication apparatus such as a router to connect to a communication network such as the Internet or a WAN which is the global network.

Figure 7:
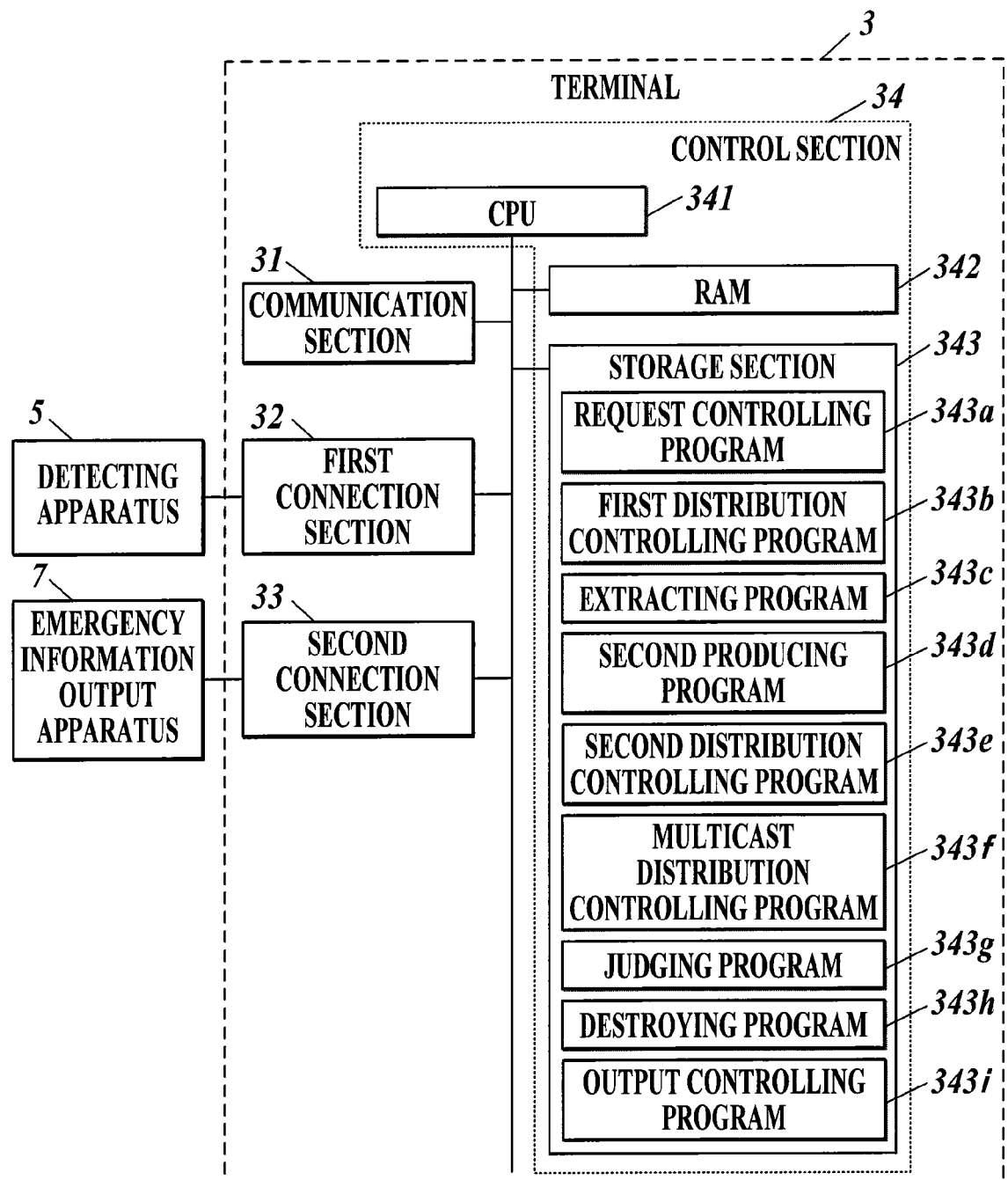
FIG. 7 is a block diagram showing a functional structure of a terminal shown in FIG. 1.

As shown in FIG. 7, the terminal 3 includes, for example, a communication section 31, a first connection section 32, a second connection section 33, a control section 34, etc.

Also, as shown in FIG. 7, for example, the terminal 3 is connected to a detecting apparatus 5 to detect a predetermined abnormal condition, an emergency information output apparatus 7 to output emergency information distributed to the terminal 3 so as to be able to be seen or heard, etc.

The communication section 31, for example, sends and receives various pieces of data between the SIP server 1 or other terminals 3 through the global network.

Specifically, for example, when the terminal 3 functions as the distribution source terminal (first distribution source terminal), for example, as a requesting section, according to a control signal input from the control section 34, the communication section 31 sends to the SIP server 1 emergency information to be distributed and requests sending of the distribution destination information concerning the distribution destination terminal to which the emergency information is to be distributed.

Also, when the terminal 3 functions as a distribution source terminal (first distribution source terminal and/or second distribution source terminal), the communication section 31 receives the distribution destination information and the emergency information sent from the SIP server 1.

Also, for example, when the terminal 3 functions as a distribution source terminal (first distribution source terminal and/or second distribution source terminal), for example, as a distributing section, according to a control signal input from the control section 34, the communication section 31 connects to the distribution destination terminal (terminal 3) based on the distribution destination information sent from the SIP server 1 to establish a session to distribute to the distribution destination terminal emergency information and distribution destination information by peer-to-peer (P to P) communication.

Also, for example, when the terminal 3 functions as a distribution source terminal (first distribution source terminal), according to a control signal input from the control section 34, in a case where a request for distribution destination information to be sent is not received by the SIP server 1, the communication section 31, for example, functions as a multicast distributing section and uses a port for multicast communication based on port information previously provided from the SIP server 1 to distribute by multicast communication to other terminal 3 the emergency information and judgment information to judge whether or not the terminal applies to a distribution destination terminal to which the emergency information is to be distributed.

For example, when the terminal 3 functions as a distribution destination terminal, the communication section 31 receives emergency information distributed from other terminal 3 and distribution destination information.

Also, for example, when the terminal 3 functions as a distribution destination terminal, for example, according to a control signal input from the control section 34, based on the assignment information extracted by the CPU 341 (later described) performing the extracting program 343c, the communication section 31 functions as a second distributing section, and connects to other distribution destination terminal (terminal 3) based on the assigned terminal information, establishes a session and distributes to other distribution destination terminal emergency information and distribution destination information by peer-to-peer (P to P) communication.

For example, according to the control signal input from the control section 34, based on the distribution destination information sent from the SIP server 1 or the sub-terminal information included in the distribution destination information distributed from other terminal 3, the communication section 31 distributes emergency information to the sub-terminal by telephone, facsimile, e-mail, etc.

Also, for example, according to a control signal input from the control section 34, based on the emergency contact information included in the distribution destination information sent from the SIP server 1 or the distribution destination information distributed from other terminal 3, the communication section 31 distributes the emergency information to the emergency contacts by telephone, facsimile, e-mail, etc.

The first connection section 32, for example, includes an interface to connect to the detecting apparatus 5 and outputs a detecting signal input from the detecting apparatus 5 to the control section 34.

The detecting apparatus 5, for example, detects a predetermined abnormal condition based on a disaster or incident which occurred and inputs the detecting signal to the first connection section 32.

The second connection section 33, for example, includes an interface to connect to the emergency information output apparatus 7, and according to a control signal input from the control section 34, outputs emergency information distributed from other terminal 3 to the emergency information output apparatus 7.

The emergency information output apparatus 7 is a display apparatus, sound output apparatus, printing apparatus, etc. to output the emergency information input from the second connection section 33 so that the emergency information can be seen or heard.

The control section 34, for example, as shown in FIG. 7 includes a CPU 341, RAM 342, storage section 343, and the like.

The CPU 341, for example, performs various control operation according to various processing programs for the terminal 3 stored in the storage section 343.

The RAM 342, for example, includes a program storage area to develop a processing program, etc. performed by the CPU 341, data storage area to store input data, a processing result when the above-described processing program is performed, etc., and the like.

The storage section 343, for example, stores a system program which can be performed by the terminal 3, various processing programs which can be performed by the system program, pieces of data used when these various processing programs are performed, data of the processing result of arithmetic processing by the CPU 341 and the like. The program is stored in the storage section 343 in a format of a program code readable by a computer.

Specifically, as shown in FIG. 7, the storage section 343, for example, stores a request controlling program 343a, first distribution controlling program 343b, extracting program 343c, second producing program 343d, second distribution controlling program 343e, multicast distribution controlling program 343f, judging program 343g, destroying program 343h, output controlling program 343i and the like.

When the terminal 3 functions as the distribution source terminal (first distribution source terminal), the request controlling program 343a, for example, allows the CPU 341 to realize a function to input a control signal to the communication section 31 to allow the communication section 31 to send to the SIP server 1 emergency information to be distributed and to request sending of distribution destination information concerning distribution destination terminal to which the emergency information is to be distributed.

Specifically, for example, when the detecting apparatus 5 detects a predetermined abnormal condition and inputs the detecting signal to the first connection section 32, the CPU 341 generates emergency information according to the abnormal condition and allows the communication section 31 to send the generated emergency information to the SIP server 1 and to request to the SIP server 1 the distribution destination information to be sent.

When the terminal 3 functions as the distribution source terminal (first distribution source terminal and/or second distribution source terminal), the first distribution controlling program 343b, for example, allows the CPU 341 to realize a function to input a control signal to the communication section 31 to allow the communication section 31 to connect to the distribution destination terminal based on the distribution destination information sent from the SIP server 1 and to distribute the emergency information and distribution destination information to the distribution destination terminal by peer-to-peer (P to P) communication.

Specifically, for example, based on the distribution destination information sent from the SIP server 1, the CPU 341 allows the communication section 31 to distribute the emergency information and the distribution destination information to the distribution destination terminal first in the priority order set by the SIP server 1.

Incidentally, for example, the CPU 341 may distribute to each of the distribution destination terminals first in the priority order, distribution destination information distributed from the SIP server 1, or distribution destination information concerning a column of distribution destination terminal first in the priority order of the distribution destination information distributed from the SIP server 1.

Here, for example, when the emergency information is transmitted as shown in FIG. 5, to distribute distribution destination information concerning the column of distribution destination terminal first in the priority order of the distribution destination information distributed from the SIP server 1 means to distribute to distribution destination terminal of "distribution destination 1" distribution destination information including assignment information for distribution destination terminal of "distribution destination 1" and assignment information for distribution destination terminal of "distribution destination 2", to distribute to distribution destination terminal of "distribution destination 4" distribution destination information including assignment information for distribution destination terminal of "distribution destination 4", assignment information for distribution destination terminal of "distribution destination 5", and assignment information for distribution destination terminal of "distribution destination 6", and to distribute to distribution destination terminal of "distribution destination 8" distribution destination information including assignment information for distribution destination terminal of "distribution destination 8", assignment information for distribution destination terminal of "distribution destination 9", and assignment information for distribution destination terminal of "distribution destination 10". Also, for example, when emergency information is transmitted as shown in FIG. 6, to distribute distribution destination information concerning the column of distribution destination terminal first in the priority order of the distribution destination information distributed from the SIP server 1 means to distribute to distribution destination terminal of "distribution destination 1" distribution destination information including assignment information for distribution destination terminal of "distribution destination 1", to distribute to distribution destination terminal of "distribution destination 2" distribution destination information including assignment information for distribution destination terminal of "distribution destination 2", and to distribute to distribution destination terminal of "distribution destination 3" distribution destination information including assignment information for distribution destination terminal of "distribution destination 3".

Also, based on the sub-terminal information first in the priority order included in the distribution destination information sent from the SIP server 1, for example, the CPU 341 inputs a control signal to the communication section 31 and allows the communication section 31 to distribute emergency information to the sub-terminal by telephone, facsimile, e-mail, etc.

Also, based on the emergency contact information corresponding to the terminal information first in the priority order included in the distribution destination information sent from the SIP server 1, for example, the CPU 341 inputs a control signal to the communication section 31 and allows the communication section 31 to distribute emergency information to the emergency contacts by telephone, facsimile, e-mail, etc.

For example, when the terminal 3 functions as a distribution destination terminal, the extracting program 343c allows the CPU 341 to realize a function to extract appropriate assignment information (own assignment information) from the distribution destination information distributed from the distribution source terminal (first distribution source terminal and/or second distribution source terminal) or other distribution destination terminal.

In other words, the CPU 341 extracts the assignment information for the terminal 3 including the certain CPU 341.

Specifically, for example, when the CPU 341 is the CPU included in the distribution destination terminal of "distribution destination 1", the CPU 341 extracts assignment information for the distribution destination terminal of "distribution destination 1" from the assignment information included in the distribution destination information.

Alternatively, for example, when the CPU 341 is the CPU included in the distribution destination terminal of "distribution destination 2", the CPU 341 extracts assignment information for the distribution destination terminal of "distribution destination 2" from the assignment information included in the distribution destination information.

By performing the extracting program 343c, the CPU 341 functions as an extracting section.

For example, when the terminal 3 functions as a distribution destination terminal, the second producing program 343d allows the CPU 341 to realize a function to delete the appropriate assignment information extracted by the CPU 341 performing the extracting program 343c, from the distribution destination information distributed from the distribution source terminal (first distribution source terminal and/or second distribution source terminal) or other distribution destination terminal and produce new distribution destination information.

By performing the second producing program 343d, the CPU 341 functions as a second producing section.

When the terminal 3 functions as a distribution destination terminal, for example, the second distribution controlling program 343e allows the CPU 341 to realize a function to input a control signal to the communication section 31 to allow the communication section 31 to connect to other distribution destination terminal based on the assigned terminal information based on the assignment information extracted by the CPU 341 by performing the extracting program 343c to distribute to other distribution destination terminal by peer-to-peer communication emergency information and distribution destination information produced by the CPU 341 by performing the second producing program 343d.

When the extracted assignment information includes sub-terminal information, the CPU 341 inputs a control signal to the communication section 31 and, based on the sub-terminal information, allows the communication section 31 to distribute emergency information to the sub-terminal by telephone, facsimile, e-mail, etc.

Also, when the extracted assignment information includes emergency contact information, the CPU 341 inputs a control signal to the communication section 31 and, based on the emergency contact information, allows the communication section 31 to distribute emergency information to the emergency contact by telephone, facsimile, e-mail, etc.

For example, when the terminal 3 functions as a distribution source terminal (first distribution source terminal), in a case where a request for distribution destination information to be sent is not received by the SIP server 1, the multicast distribution controlling program 343f allows the CPU 341 to realize a function to input a control signal to the communication section 31 to allow the communication section 31 to distribute to other terminal 3 by multicast communication the emergency information and judgment information to judge whether or not the terminal applies to a distribution destination terminal to which the emergency information is to be distributed by using a port for multicast communication based on port information previously provided from the SIP server 1.

In other words, the CPU 341 allows the communication section 31 to distribute by multicast communication emergency information and judgment information to all terminals 3 composing the information distribution system 1000 except the terminal 3 including the CPU 341.

Here, for example, when the SIP server 1 stops, etc. due to the influence of the disaster or incident, since the distribution source terminal (first distribution source terminal and/or second distribution source terminal) cannot obtain distribution destination information, the distribution source terminal cannot distribute emergency information to other terminal 3 by peer-to-peer communication. Alternatively, by using the port for multicast communication, emergency information can be distributed to other terminal 3 by multicast communication.

Specifically, for example, when the CPU 341 requests the distribution destination information to be sent, in a case where the CPU 341 cannot connect to the SIP server 1 or communication with the SIP server 1 is lost and a response signal is not input from the SIP server 1, the CPU 341 judges the distribution destination information sending request is not received.

For example, when the terminal 3 belonging to the "(X city Y town) first block group" is the distribution destination terminal to which the emergency information is distributed, judgment information is information for other terminal 3 distributed with the emergency information by the multicast communication to judge the emergency information is emergency information for terminal 3 belonging to the "(X city Y town) first block group".

For example, when the terminal 3 functions as the distribution destination terminal, the judging program 343g allows the CPU 341 to realize a function of judging whether or not the terminal applies to the distribution destination terminal based on the judgment information distributed by the multicast communication.

In other words, based on the judgment information, the CPU 341 judges whether or not the terminal 3 including the CPU 341 applies to the distribution destination terminal.

By performing the judging program 343g, the CPU 341 functions as a judging section.

For example, when the terminal 3 functions as a distribution destination terminal, for example, in a case where the CPU 341 performing the judgment program 343g judges the terminal does not apply to the distribution destination terminal, the destroying program 343h allows the CPU 341 to realize a function to destroy the emergency information distributed by multicast communication.

By performing the destroying program 343h, the CPU 341 functions as a destroying section.

For example, when the terminal 3 functions as a distribution destination terminal, the output controlling program 343i, for example, allows the CPU 341 to realize a function to input a control signal to the second connection section 33 to output to the emergency information output apparatus 7 emergency information distributed from the distribution source terminal (first distribution source terminal and/or second distribution source terminal) or other distribution destination terminal.

Incidentally, for example, when the terminal 3 functions as a distribution source terminal (first distribution source terminal and/or second distribution source terminal), the CPU 341, for example, may input a control signal to the second connection section 33 to output to the emergency information output apparatus 7 emergency information generated based on a predetermined abnormal condition detected by the detecting apparatus 5 or emergency information sent from the SIP server 1.

<Distribution Destination Information Sending Processing by the SIP Server>

Figure 8:
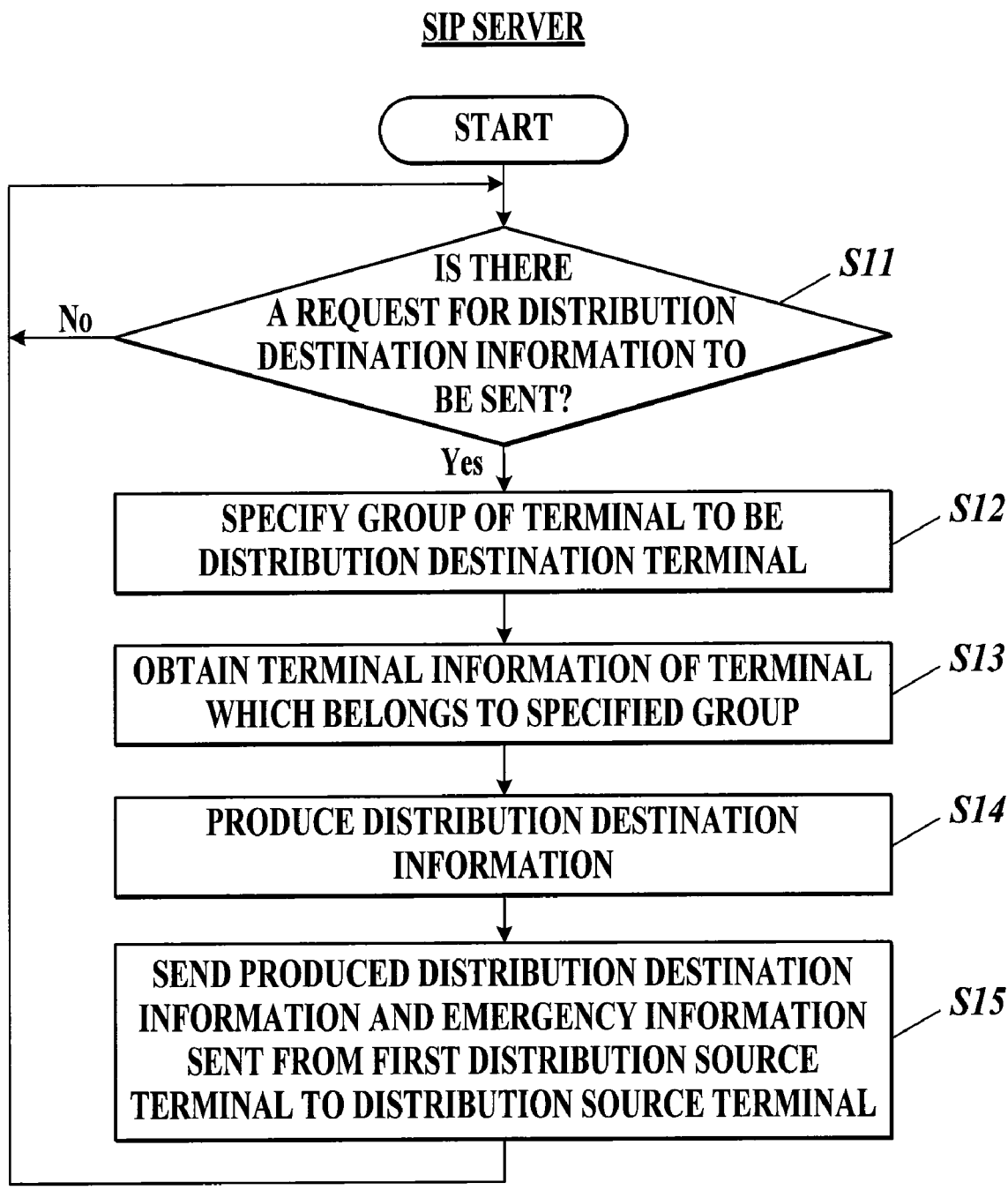
FIG. 8 is a flowchart explaining processing concerning sending distribution destination information by the SIP server of the information distribution system according to the present embodiment.

A processing concerning sending distribution destination information by the SIP server 1 of the information distribution system 1000 is described with reference to the flowchart shown in FIG. 8.

First, the CPU 131 of the SIP server 1 judges whether or not the communication section 31 received emergency information sent from the terminal 3 (distribution source terminal (first distribution source terminal)) and whether or not sending of the distribution destination information was requested by the terminal 3 (distribution source terminal (first distribution source terminal)) (step S11).

In step S11, when the CPU 131 judges a request for the distribution destination information to be sent was made from the terminal 3 (step S11; Yes), the CPU 131 performs the specifying program 133b to specify the group of terminal 3 which is to be the distribution destination terminal according to location of distribution source terminal (first distribution source terminal) requesting the distribution destination information, type of emergency information distributed, etc. (step S12).

Next, the CPU 131 performs the obtaining program 133c to obtain terminal information of the terminal 3 belonging to the specified group from the terminal information stored in the memory section 12 (step S13).

Next, the CPU 131 performs the first producing program 133e to produce distribution destination information based on the obtained terminal information (step S14).

Here, for example, when the type of emergency information distributed by the distribution destination terminal is a predetermined type, the CPU 131 obtains emergency contact information of the emergency contact corresponding to the terminal 3 belonging to the specified group and includes the information in the distribution destination information to be produced.

Also, for example, when terminal information of a terminal 3 not presently connected to the SIP server 1 is included in the obtained terminal information, the CPU 131 obtains the sub-terminal information of the sub-terminal whose main terminal is the terminal 3 not connected to the SIP server 1, and the obtained sub-terminal information is included in the distribution destination information to be produced in addition to or instead of the terminal information of the terminal 3 not connected to the SIP server 1.

Also, for example, when there are a plurality of pieces of obtained terminal information, the CPU 131 performs the setting program 133d to set the priority order to distribute the emergency information to the distribution destination terminal based on the plurality of pieces of terminal information and includes in the distribution destination information to be produced the assignment information to assign, with respect to each distribution destination terminal, the terminal information of other distribution destination terminal to which the distribution destination terminal distributes emergency information so that emergency information is distributed according to the set priority order.

Next, for example, the CPU 131 performs the sending controlling program 133f to send distribution destination information produced in step S14 and emergency information sent from the terminal 3 (distribution source terminal (first distribution source terminal)) to the distribution source terminal (first distribution source terminal and/or second distribution source terminal) (step S15) and repeats the processing of step S11 and after.

<Distribution Destination Information Requesting Processing by the First Distribution Source Terminal>

Figure 9:
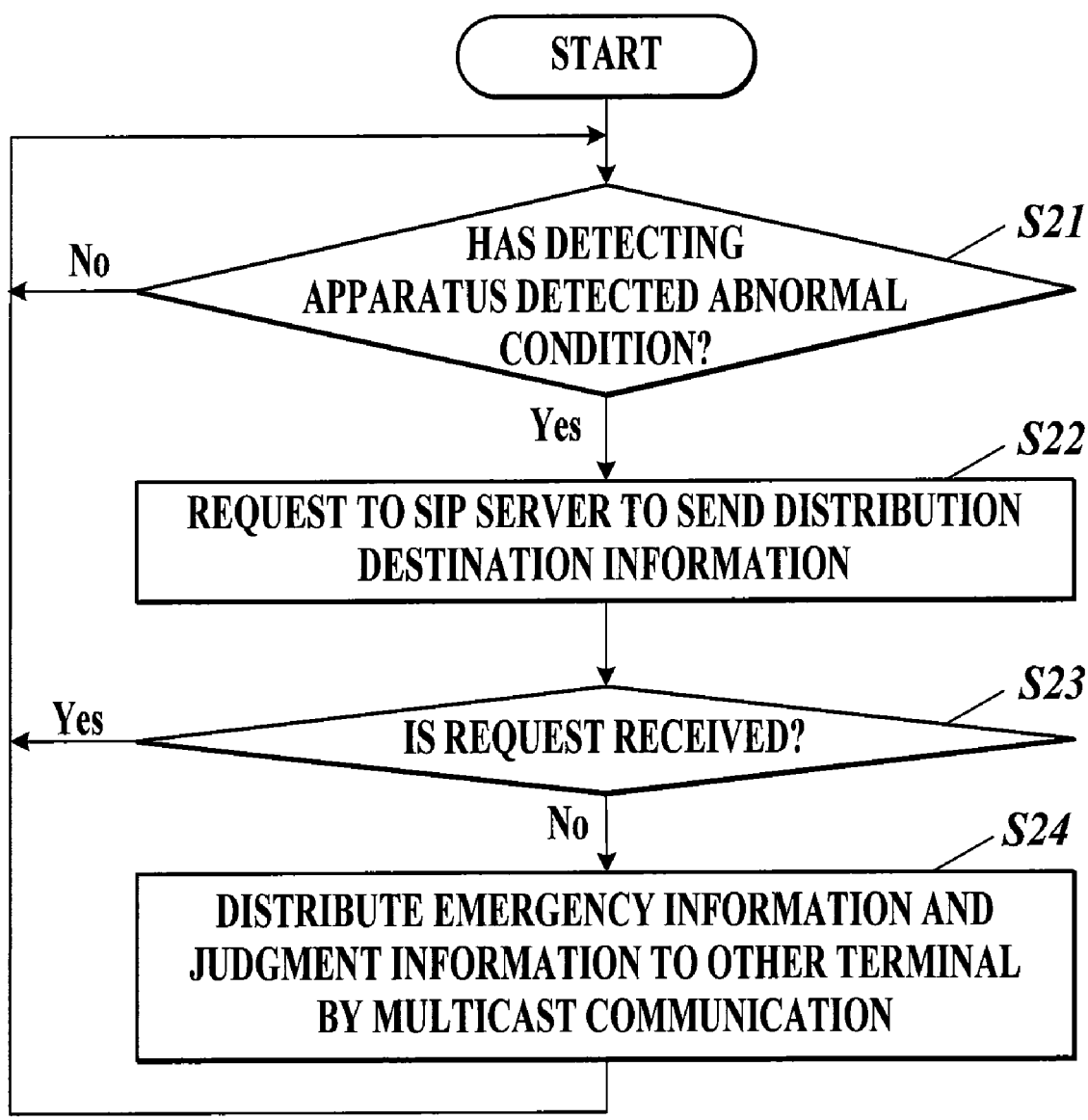
FIG. 9 is a flowchart explaining processing concerning requesting distribution destination information by a first distribution source terminal of the information distribution system according to the present embodiment.

A processing concerning request of distribution destination information by the distribution source terminal (first distribution source terminal) of the information distribution system 1000 is described with reference to the flowchart shown in FIG. 9.

First, the CPU 341 of the terminal 3 (first distribution source terminal) judges whether or not the detecting apparatus 5 detected a predetermined abnormal condition (step S21).

In step S21, when the CPU 341 judges the detecting apparatus 5 did not detect a predetermined abnormal condition (step S21; No), the CPU 341 repeats the processing of step S21.

Alternatively, in step S21, when the CPU 341 judges the detecting apparatus 5 detected a predetermined abnormal condition (step S21; Yes), the CPU 341 generates emergency information according to the abnormal condition and performs the request controlling program 343*a* to send the generated emergency information to the SIP server 1 and to request to the SIP server 1 to send the distribution destination information concerning the distribution destination terminal to which the generated emergency information is to be distributed (step S22).

Next, the CPU 341 judges whether or not the request in step S22 is received by the SIP server 1 (step S23).

In step S23, when the CPU 341 judges the request in step S22 is received by the SIP server 1 (step S23; Yes), the CPU 341 repeats the processing of step S21 and after.

Alternatively, in step S23, when the CPU 341 judges the request in step S22 is not received by the SIP server 1 (step S23; No), the CPU 341 performs the multicast distribution controlling program 343*f* to distribute to other terminal 3 emergency information and judgment information to judge whether or not the terminal applies to the distribution destination terminal to which the emergency information is distributed and the information is distributed by multicast communication using a port for multicast communication based on the port information previously provided by the SIP server 1 (step S24), and the CPU 341 repeats the processing of the step S21 and after.

<Emergency Information Distribution Processing by the Distribution Source Terminal>

Figure 10:
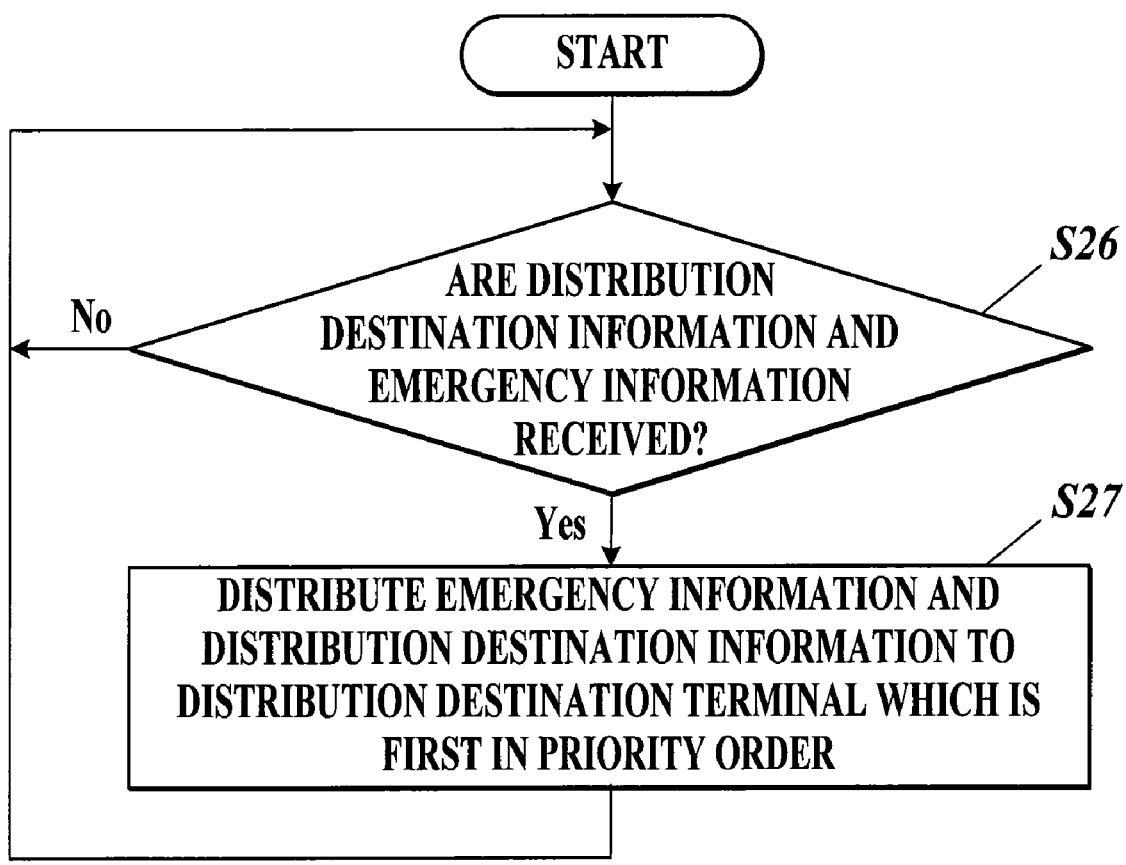
FIG. 10 is a flowchart explaining a processing concerning distributing emergency information with peer-to-peer communication by a distribution source terminal of the information distribution system according to the present embodiment.

A processing concerning distribution of emergency information using peer-to-peer communication by the distribution source terminal (first distribution source terminal and/or second distribution source terminal) of the information distribution system 1000 is described with reference to the flowchart shown in FIG. 10.

First, the CPU 341 of the terminal 3 (first distribution source terminal and/or second distribution source terminal) judges whether or not the communication section 31 received the distribution destination information and the emergency information sent from the SIP server 1 (step S26).

In step S26, when the CPU 341 judges the distribution destination information and the emergency information sent from the SIP server 1 is not received (step S26; No), the CPU 341 repeats the processing of step S26.

Alternatively, in step S26, when the CPU 341 judges the distribution destination information and the emergency information sent from the SIP server 1 is received (step S26; Yes), the CPU 341 performs the first distribution controlling program 343*b* to distribute the emergency information and the distribution destination information sent from the SIP server 1 by peer-to-peer communication to the distribution destination terminal first in the priority order based on the distribution destination information sent from the SIP server 1 (step S27), and the CPU 341 repeats the processing of step S26 and after.

<Distribution Destination Information Distribution Processing by the Distribution Destination Terminal>

Figure 11:
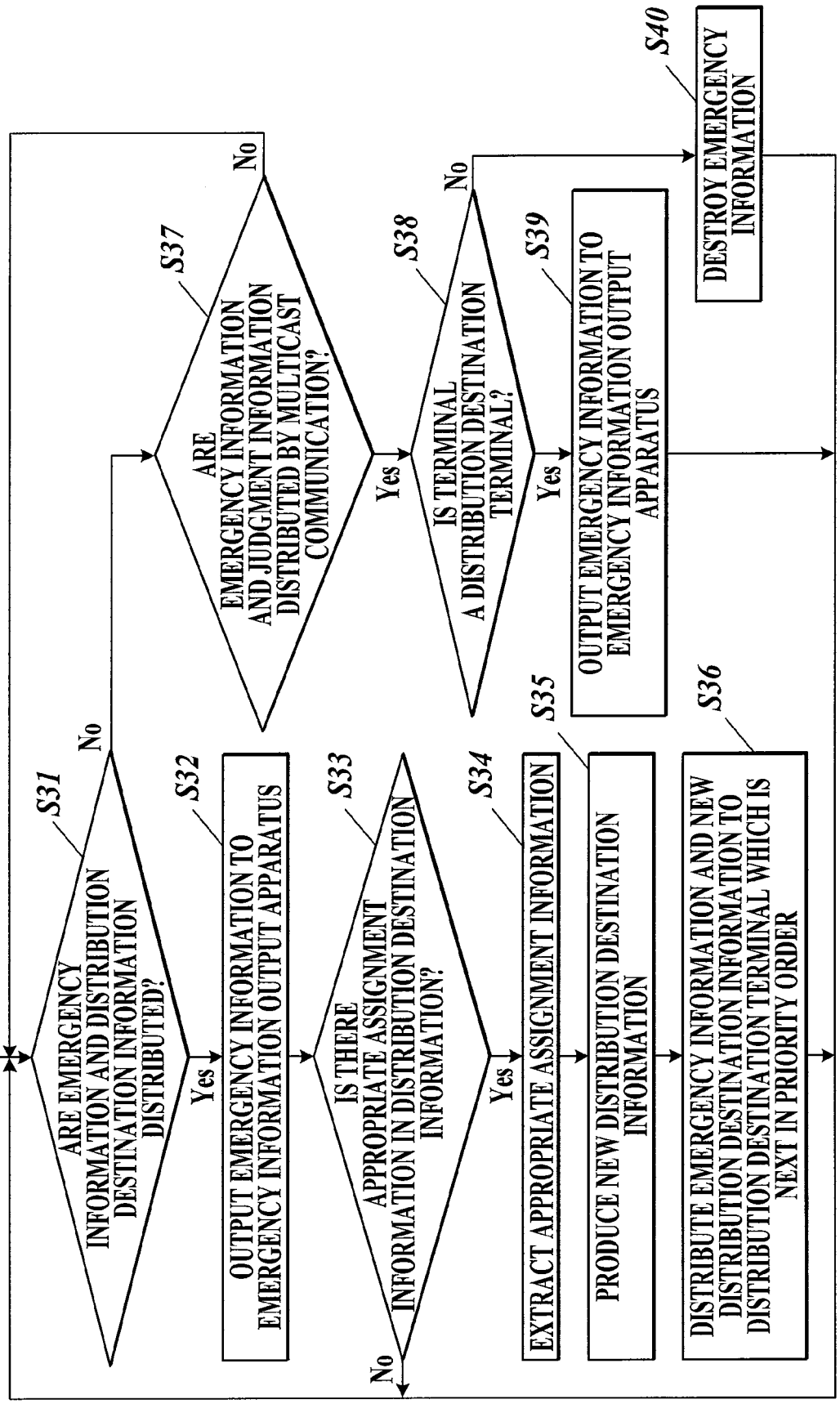
FIG. 11 is a flowchart explaining a processing concerning distributing distribution destination information by distribution destination terminal of the information distribution system according to the present embodiment.

A processing concerning the distribution of distribution destination information by the distribution destination terminal of the information distribution system 1000 is described with reference to the flowchart shown in FIG. 11.

First, the CPU 341 of the terminal 3 (distribution destination terminal) judges whether or not the communication section 31 received the emergency information and the distribution destination information distributed from the distribution source terminal (first distribution source terminal and/or second distribution source terminal) or other distribution destination terminal (step S31).

In step S31, when the CPU 341 judges the emergency information and the distribution destination information distributed from the distribution source terminal (first distribution source terminal and/or second distribution source terminal) or other distribution destination terminal is received (step S31; Yes), the CPU 341 performs the output controlling program 343*i* to output the distributed emergency information to the emergency information output apparatus 7 (step S32).

Next, the CPU 341 judges whether or not appropriate assignment information is included in the distributed distribution destination information (step S33).

In step S33, when the CPU 341 judges there is no appropriate assignment information in the distributed distribution destination information (step S33; No), the CPU 341 repeats the processing of step S31 and after.

Here, when there is no appropriate assignment information in the distributed distribution destination information, this means, for example, the terminal 3 is a distribution destination terminal with the lowest priority order.

On the other hand, in step S33, when the CPU 341 judges there is appropriate assignment information in the distributed distribution destination information (step S33), the CPU 341 performs the extracting program 343*c* to extract the appropriate assignment information from the distributed distribution destination information (step S34).

Next, the CPU 341 performs the second producing program 343*d* to delete the assignment information extracted in step S34 from the distributed distribution destination information and to produce new distribution destination information (step S35).

Next, the CPU 341 performs the second distribution controlling program 343*e* to distribute emergency information and distribution destination information newly produced in step S35 to other distribution destination terminal based on assigned terminal information based on assignment information extracted in step S34 (in other words, to distribution destination terminal which is next in priority order)(step S36) and the CPU 341 repeats the processing of step S31 and after.

Alternatively, in step S31, when the CPU 341 judges the emergency information and the distribution destination information distributed from the distribution source terminal (first distribution source terminal and/or second distribution source terminal) or other distribution destination terminal is not received (step S31; No), the CPU 341 judges whether or not the emergency information and judgment information distributed from the distribution source terminal (first distribution source terminal) by multicast communication is received (step S37).

In step S37, when the CPU 341 judges the emergency information and the judgment information distributed from the distribution source terminal (first distribution source terminal) by multicast communication is not received (step S37; No), the CPU 341 repeats the processing of step S31 and after.

On the other hand, in step S37, when the CPU 341 judges the emergency information and the judgment information distributed from the distribution source terminal (first distribution source terminal) by multicast communication is received (step S37; Yes), the CPU 341 performs the judging program 343g to judge whether or not the terminal applies to the distribution destination terminal based on the distributed judgment information (step S38).

In step S38, when the CPU 341 judges the terminal applies to the distribution destination terminal (step S38; Yes), the CPU 341 performs the output controlling program 343i to output the distributed emergency information to the emergency information output apparatus 7 (step S39) and the CPU 341 repeats the processing of step S31 and after.

On the other hand, in step S38, when the CPU 341 judges the terminal does not apply to the distribution destination terminal (step S38; No), the CPU 341 performs the destroying program 343h to destroy the distributed emergency information (step S40) and the CPU 341 repeats the processing of step S31 and after.

According to the above described embodiment, the information distribution system 1000 includes the SIP server 1, and a plurality of terminals 3 registered to the SIP server 1, the plurality of terminals 3 are composed of the distribution source terminal (first distribution source terminal and/or second distribution source terminal) to distribute emergency information and the distribution destination terminal to which the emergency information is distributed, the SIP server 1 includes a memory section 12 to store terminal information concerning the terminal 3, the CPU 131 performing the obtaining program 133c to obtain terminal information of a terminal which is to be the distribution destination terminal from terminal information stored in the memory section 12 when the distribution source terminal (first distribution source terminal) requests distribution destination information concerning the distribution destination terminal to be sent; the CPU 131 performing the first producing program 133e to produce the distribution destination information based on the obtained terminal information; and the produced distribution destination information is sent to the distribution source terminal (first distribution source terminal and/or second distribution source terminal), the distribution source terminal (first distribution source terminal) requests the distribution destination information to be sent to the SIP server 1, and the distribution source terminal (first distribution source terminal and/or second distribution source terminal) connect to the distribution destination terminal based on the distribution destination information sent from the SIP server 1 to distribute to the distribution destination terminal the emergency information by peer-to-peer communication.

Therefore, since emergency information can be distributed without management of emergency information or server for management of information to be distributed, the burden of cost necessary for system construction can be reduced. Also, since the terminal 3 (distribution source terminal (first distribution source terminal and/or second distribution source terminal) distributes the emergency information, the burden of the server (SIP server 1) can be reduced.

Further, according to the above described information distribution system 1000 of the present invention, the distribution source terminal includes a first distribution source terminal to request distribution destination information as well as to distribute emergency information and a second distribution source terminal to distribute emergency information, and when the first distribution source terminal requests to the SIP server 1 that the distribution destination information to be sent, the first distribution source terminal sends emergency information to the SIP server 1 and the SIP server 1 sends to the first distribution source terminal and/or the second distribution source terminal the distribution destination information and the emergency information sent from the first distribution source terminal.

Consequently, since a terminal other than the first distribution source terminal (second distribution source terminal) which requested the distribution destination information can also distribute the emergency information, even when the first distribution source terminal stops, etc., due to influence of the disaster or the incident, information can be distributed reliably and with high speed even when there is a large number of distribution destination terminals.

According to the above described embodiment, in the information distribution system 1000, when there are a plurality of pieces of terminal information obtained by the CPU 131 performing the obtaining program 133c, the SIP server 1 includes a CPU 131 performing the setting program 133d to set a priority order to distribute emergency information to distribution destination terminal based on the plurality of pieces of terminal information, the CPU 131 performing the first producing program 133e produces distribution destination information including assignment information to assign, with respect to each distribution destination terminal, the terminal information of other distribution destination terminal to which the distribution destination terminal distributes the emergency information so that the emergency information is distributed according to the set priority order, the distribution source terminal (first distribution source terminal and/or second distribution source terminal) distributes emergency information and distribution destination information to the distribution destination terminal first in the set priority order based on the distribution destination information sent from the SIP server 1, the distribution destination terminal includes the CPU 341 performing the extracting program 343c to extract assignment information for the distribution destination terminal from the distribution destination information distributed by the distribution source terminal (first distribution source terminal and/or second distribution source terminal) or other distribution destination terminal, and the emergency information and the distribution destination information is distributed by peer-to-peer communication to other distribution destination terminal based on the terminal information assigned to the distribution destination terminal based on the extracted assignment information.

In other words, the distribution destination terminal distributes the emergency information to other distribution destination terminal according to the priority order set by the distribution destination terminal. Consequently, since the distribution source terminal (first distribution source terminal and/or second distribution source terminal) does not need to distribute the emergency information to all of the distribution destination terminals, the burden on the distribution source terminal (first distribution source terminal and/or second distribution source terminal) can be reduced.

Also, according to the above described information distribution system 1000 of the present embodiment, the distribution destination terminal includes a CPU 341 to perform a second producing program 343d to delete assignment information for the distribution destination terminal extracted by the CPU 341 performing the extracting program 343c from the distribution destination information distributed from the distribution source terminal (first distribution source terminal and/or second distribution source terminal) or other distribution destination terminal to produce new distribution destination information and the distribution destination terminal distributes emergency information and the produced distribution destination information.

In other words, as the emergency information is transmitted, the information amount of the distribution destination information transmitted with the emergency information becomes smaller, and consequently the burden on the distribution destination terminal becomes smaller.

Also, according to the above described embodiment, in the information distribution system 1000, the SIP server 1 includes the CPU 131 performing the providing program 133a to provide port information concerning the port for multicast communication to the terminal 3 registered to the SIP server 1, when the request for distribution destination information to be sent is not received by the SIP server 1, the distribution source terminal (first distribution source terminal) uses the port for multicast communication based on the provided port information to distribute emergency information and judgment information to judge whether or not the terminal applies to the distribution destination terminal to which the emergency information is to be sent to other terminal 3 by multicast communication. Also, the terminal 3 includes the CPU 131 performing judging program 343g to judge whether or not the terminal 3 applies to the distribution destination terminal based on the judgment information distributed by the multicast communication, and the CPU 341 performing the destroying program 343h to destroy the emergency information distributed by the multicast information when it is judged that the terminal 3 does not apply to the distribution destination terminal.

Here, for example, when the SIP server 1 stops, etc. due to the influence of the disaster or the incident, since the distribution source terminal (first distribution source terminal and/or second distribution source terminal) cannot obtain distribution destination information, the distribution source terminal cannot distribute emergency information by peer-to-peer communication to other terminal 3. Alternatively, by using the port for multicast communication, the emergency information can be distributed to other terminal 3.

Also, when the port for multicast communication is used, although the emergency information is distributed to all of the other terminals 3, since judgment information is distributed with the emergency information, each terminal 3 can judge whether or not the distributed emergency information is emergency information concerning the terminal 3 (itself) and consequently, unnecessarily notifying emergency information to a user of the terminal 3 can be prevented.

The present embodiment is not limited to the above described embodiments and the embodiments shown may be modified without leaving the spirit of the invention.

The terminal 3 and the emergency information output apparatus 7 can be composed integrally. The terminal 3 composed integrally with the emergency information output apparatus 7 is for example, a personal computer, telephone machine, facsimile sending and receiving machine, etc.

The terminal 3 does not have to be connected to the detecting apparatus 5, and for example, the terminal 3 may include an operating section and the terminal 3 can request sending of distribution destination information to the SIP server 1 when a user who finds an abnormal condition (an occurrence of a disaster or incident) operates the operating section.

When the registration valid duration of a distribution source terminal expires while the emergency information is distributed, the distribution source terminal becomes a terminal 3 not connected to the SIP server 1. In this case, since the distribution source terminal cannot establish a session with other terminal 3, the emergency information cannot be distributed to the terminal 3 not presently connected to the SIP server 1.

Therefore, for example, when the information distribution system 1000 is composed by providing the terminal 3 with a section to judge, when the emergency information is distributed, whether or not there is a distribution destination terminal which cannot be connected to and a section to send to the SIP server 1 the terminal information of the distribution destination terminal when it is judged there is a distribution destination terminal which cannot be connected to, and by providing the SIP server 1 with a section to confirm whether or not the distribution destination terminal based on the sent terminal information is presently connected to the SIP server 1 and the SIP server 1 obtains sub-terminal information of the sub-terminal whose main terminal is the terminal 3 when it is confirmed by the CPU 131 performing the obtaining program 133c that the terminal 3 based on the sent terminal information is not presently connected to the SIP server 1, when the emergency information cannot be distributed to other terminal 3, instead of the terminal 3 to which emergency information cannot be distributed, each terminal 3 can distribute the emergency information to the sub-terminal whose main terminal is the terminal 3 to which emergency information cannot be distributed.

In the present embodiment, the sub-terminal information is obtained when the terminal information of the terminal 3 which is not presently connected to the SIP server 1 is included in the obtained terminal information. Alternatively, regardless of whether or not the terminal information of the terminal 3 which is not presently connected to the SIP server 1 is included in the obtained terminal information, sub-terminal information corresponding to the terminal information can be obtained with the terminal information and the sub-terminal information can be associated with the terminal information and included in the distribution destination information. In this case, the emergency information can be distributed to the terminal 3 and the sub-terminal whose main terminal is the terminal 3.

In the processing (FIG. 11) concerning the distribution of the distribution destination information by the distribution destination terminal of the information distribution system 1000 described in the present embodiment, the emergency information is distributed to other distribution destination terminal after the emergency information is output to the emergency information output apparatus 7. Alternatively, the emergency information can be distributed to other distribution destination terminal substantially simultaneously to when the emergency information is output to the emergency information output apparatus 7.

The predetermined information distributed from the distribution source terminal is not limited to emergency information and can be any information which needs to be distributed to other terminal 3, and can be information such as information concerning public relations of a municipality. In this case, for example, the distribution source terminal should be, for example, the terminal 3 owned by the municipality.

According to a first aspect of the preferred embodiments, there is provided an information distribution system including:
 a Session Initiation Protocol (SIP) server; and
 a plurality of terminals registered to the SIP server, wherein the plurality of terminals are composed of:
  a distribution source terminal to distribute predetermined information; and a distribution destination terminal to which the predetermined information is distributed, the SIP server includes:

a storage section to store terminal information concerning the terminal;

an obtaining section to obtain terminal information of a terminal which is to be the distribution destination terminal from terminal information stored in the storage section when the distribution source terminal requests distribution destination information concerning the distribution destination terminal to be sent;

a producing section to produce the distribution destination information based on the terminal information obtained by the obtaining section; and a sending section to send distribution destination information produced by the producing section to the distribution source terminal, the distribution source terminal includes:

a requesting section to request to the SIP server to send the distribution destination information; and a distributing section to connect to the distribution destination terminal based on the distribution destination information sent from the sending section and to distribute the predetermined information to the distribution destination terminal by peer-to-peer communication, the distribution source terminal is composed of:

a first distribution source terminal including the requesting section and the distributing section; and a second distribution source terminal including the distributing section;

the requesting section sends the predetermined information to the SIP server when the requesting section requests to the SIP server to send the distribution destination information, and the sending section sends the distribution destination information and the predetermined information sent by the requesting section to the first distribution source terminal and/or the second distribution source terminal.

Preferably, in the information distribution system, the SIP server includes a setting section to set a priority order for distributing the predetermined information to the distribution destination terminal based on a plurality of pieces of terminal information when there are the plurality of pieces of terminal information obtained by the obtaining section;

the producing section produces the distribution destination information including assignment information to assign, with respect to each terminal, terminal information of other distribution destination terminal to which the distribution destination terminal distributes the predetermined information so that the predetermined information is distributed according to the priority order set by the setting section;

the distributing section distributes the predetermined information and the distribution destination information to the distribution destination terminal first in the priority order set by the setting section based on the distribution destination information sent by the sending section;

the distribution destination terminal includes:

an extracting section to extract assignment information for the distribution destination terminal from the distribution destination information distributed from the distributing section or other distribution destination terminal; and a second distributing section to distribute the predetermined information and the distribution destination information by peer-to-peer communication to other distribution destination terminal based on the terminal information assigned to the distribution destination terminal based on the assignment information extracted by the extracting section.

Preferably, in the information distribution system, the distribution destination terminal includes a second producing section to delete assignment information for the distribution destination terminal extracted by the extracting section from the distribution destination information distributed by the distributing section or the second distributing section of other distribution destination terminal to produce new distribution destination information; and the second distributing section distributes the predetermined information and the distribution destination information produced by the second producing section.

Preferably, in the information distribution system the SIP server includes a providing section to provide port information concerning a port for multicast communication to the terminals registered to the SIP server, the first distribution source terminal includes a multicast distributing section to distribute to the terminal the predetermined information and judgment information to judge whether or not the terminal applies to the distribution destination terminal to which the predetermined information is distributed using the port for multicast communication based on the port information provided by the providing section when the SIP server does not receive the request by the requesting section, the terminal includes:

a judging section to judge whether or not the terminal applies to the distribution destination terminal based on the judgment information distributed by the multicast distributing section; and a destroying section to destroy predetermined information distributed by the multicast distributing section when the judging section judges the terminal does not apply to the distribution destination terminal.

According to a second aspect of the preferred embodiments, there is provided an information distribution system including:

a Session Initiation Protocol (SIP) server; and a plurality of terminals registered to the SIP server, wherein the plurality of terminals are composed of:

a distribution source terminal to distribute predetermined information; and a distribution destination terminal to which the predetermined information is distributed, the SIP server includes:

a storage section to store terminal information concerning the terminal;

an obtaining section to obtain terminal information of a terminal which is to be the distribution destination terminal from terminal information stored in the storage section when the distribution source terminal requests distribution destination information concerning the distribution destination terminal to be sent;

a producing section to produce the distribution destination information based on the terminal information obtained by the obtaining section;

a sending section to send distribution destination information produced by the producing section to the distribution source terminal; and a setting section to set a priority order for distributing the predetermined information to the distribution destination terminal based on a plurality of pieces of terminal information when there are the plurality of pieces of terminal information obtained by the obtaining section;

the producing section produces the distribution destination information including assignment information to assign, with respect to each terminal, terminal information of other distribution destination terminal to which the distribution destination terminal distributes the predetermined information so that the predetermined information is distributed according to the priority order set by the setting section;

the distribution source terminal includes:
  a requesting section to request to the SIP server to send the distribution destination information; and
  a distributing section to connect to the distribution destination terminal based on the distribution destination information sent from the sending section and to distribute the predetermined information to the distribution destination terminal by peer-to-peer communication,
the distributing section distributes the predetermined information and the distribution destination information to the distribution destination terminal first in the priority order set by the setting section based on the distribution destination information sent by the sending section;
  the distribution destination terminal includes:
    an extracting section to extract assignment information for the distribution destination terminal from the distribution destination information distributed from the distributing section or other distribution destination terminal;
    a second distributing section to distribute the predetermined information and the distribution destination information by peer-to-peer communication to other distribution destination terminal based on the terminal information assigned to the distribution destination terminal based on the assignment information extracted by the extracting section; and
    a second producing section to delete assignment information for the distribution destination terminal extracted by the extracting section from the distribution destination information distributed by the distributing section or the second distributing section of other distribution destination terminal to produce new distribution destination information,
  the second distributing section distributes the predetermined information and the distribution destination information produced by the second producing section.
  the distribution source terminal is composed of:
    a first distribution source terminal including the requesting section and the distributing section; and
    a second distribution source terminal including the distributing section;
  the requesting section sends the predetermined information to the SIP server when the requesting section requests to the SIP server to send the distribution destination information, and
  the sending section sends the distribution destination information and the predetermined information sent by the requesting section to the first distribution source terminal and/or the second distribution source terminal.

According to the above described embodiment, the information distribution system includes the SIP server, and a plurality of terminals registered to the SIP server, the plurality of terminals are composed of the distribution source terminal to distribute predetermined information and the distribution destination terminal to which the predetermined information is distributed, the SIP server includes a storage section to store terminal information concerning the terminal, an obtaining section to obtain terminal information of a terminal which is to be the distribution destination terminal from terminal information stored in the storage section when the distribution source terminal requests distribution destination information concerning the distribution destination terminal to be sent; a producing section to produce the distribution destination information based on the terminal information obtained by the obtaining section; and a sending section to send distribution destination information produced by the producing section to the distribution source terminal, and the distribution source terminal includes a requesting section to request to the SIP server to send the distribution destination information; and a distributing section to connect to the distribution destination terminal based on the distribution destination information sent by the sending section and to distribute to the distribution destination terminal the predetermined information by peer-to-peer communication.

Therefore, since predetermined information can be distributed without management of information or server for management of information to be distributed, the burden of cost necessary for system construction can be reduced. Also, since the terminal (distribution source terminal) distributes the predetermined information, the burden of the server can be reduced.

Further, the distribution source terminal includes a first distribution source terminal including a requesting section and a distributing section and a second distribution source terminal including a distributing section, and when the requesting section requests to the SIP server the distribution destination information to be sent, the requesting section sends predetermined information to the SIP server and the sending section sends to the first distribution source terminal and/or the second distribution source terminal the distribution destination information and the predetermined information sent from the requesting section.

Consequently, since a terminal other than the first distribution source terminal (second distribution source terminal) which requested the distribution destination information can also distribute the emergency information, even when the first distribution source terminal stops, etc., due to influence of the disaster or the incident, information can be distributed reliably and with high speed even when there is a large number of distribution destination terminals.

The entire disclosure of Japanese Patent Application No. 2008-044470 filed on Feb. 26, 2008 including description, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An information distribution system comprising:
  a Session Initiation Protocol (SIP) server; and
  a plurality of terminals registered to the SIP server, wherein each of the plurality of terminals is capable of functioning as a distribution source terminal and/or a distribution destination terminal,
  the SIP server includes:
    a storage section to store first terminal information concerning all of the plurality of terminals;
    an obtaining section to obtain second terminal information of the distribution destination terminal regarding the predetermined information from the first terminal information stored in the storage section when the distribution source terminal requests first distribution destination information concerning the distribution destination terminal;
    a producing section to produce the first distribution destination information based on the second terminal information obtained by the obtaining section; and
    a sending section to send the first distribution destination information produced by the producing section to the distribution source terminal,
  the distribution source terminal functions as a first distribution source terminal and/or a second distribution source terminal, the distribution source terminal generating predetermined information based on a predetermined detecting signal, the first distribution source terminal including,
  a requesting section to request to the SIP server to send the first distribution destination information; and
  a distributing section to connect to the distribution destination terminal based on the first distribution destination information, and to distribute the predetermined information to the connected distribution destination terminal by peer-to-peer communication, and
the second distribution source terminal including a distributing section to connect to the distribution destination terminal based on the first distribution destination information sent from the SIP server by the request from the first distribution source, and to distribute the predetermined information to the connected distribution destination terminal by peer-to-peer communication, and
the predetermined information is distributed by peer-to-peer communication from the distribution source terminal to the distribution destination terminal, between which terminals a connection has been established.

2. The information distribution system according to claim 1, wherein
the SIP server includes a setting section to set a priority order for distributing the predetermined information to the distribution destination terminal based on a plurality of pieces of the second terminal information when the plurality of pieces of the second terminal information are obtained by the obtaining section;
the producing section of the SIP server produces second distribution destination information including assignment information to assign, with respect to each terminal, third terminal information of another distribution destination terminal to which the predetermined information is distributed by the distribution destination terminal, the predetermined information being distributed according to the priority order set by the setting section;
the distributing section of the first distribution source terminal and/or the second distribution source terminal distributes the predetermined information and the second distribution destination information to the distribution destination terminal first in the priority order set by the setting section based on the second distribution destination information sent by the sending section of the SIP server;
the distribution destination terminal includes:
  an extracting section to extract assignment information for the distribution destination terminal from the second distribution destination information distributed from the distributing section or the another distribution destination terminal; and
  a second distributing section to distribute the predetermined information and third distribution destination information by peer-to-peer communication to the another distribution destination terminal based on the third terminal information assigned to the distribution destination terminal based on the assignment information extracted by the extracting section.

3. The information distribution system according to claim 2, wherein
the distribution destination terminal includes a second producing section to delete assignment information for the distribution destination terminal extracted by the extracting section from the second distribution destination information distributed by the distributing section or the second distributing section of the another distribution destination terminal to produce the third distribution destination information; and
the second distributing section distributes the predetermined information and the third distribution destination information produced by the second producing section.

4. The information distribution system according to claim 1, wherein
the SIP server includes a providing section to provide port information concerning a port for multicast communication to the plurality of terminals registered to the SIP server,
the first distribution source terminal includes a multicast distributing section to distribute to the terminal the predetermined information and judgment information to judge whether or not the terminal applies to the distribution destination terminal to which the predetermined information is distributed using the port for multicast communication based on the port information provided by the providing section when the SIP server does not receive the request by the requesting section,
the terminal includes:
  a judging section to judge whether or not the terminal applies to the distribution destination terminal based on the judgment information distributed by the multicast distributing section; and
  a destroying section to destroy predetermined information distributed by the multicast distributing section when the judging section judges the terminal does not apply to the distribution destination terminal.

5. The information distribution system according to claim 2, wherein:
when the number of distribution destination terminals assigned to each priority order is substantially the same number, the producing section of the SIP server produces the assignment information, with respect to the distribution destination terminal, to assign the terminal information of other distribution destination terminals by setting the number of other distribution destination terminals as one terminal.

6. The information distribution system according to claim 2, wherein:
when the number of distribution destination terminals assigned to each priority order becomes larger as the priority order becomes lower, the producing section of the SIP server produces the assignment information, with respect to each distribution destination terminal, to assign the terminal information of other distribution destination terminals by setting the number of other distribution destination terminals as a plurality of terminals.

7. The information distribution system according to claim 1, wherein the predetermined information is emergency information including information concerning a disaster and information concerning a crime.

8. The information distribution system according to claim 1, wherein the distribution source terminal is connected to a detecting apparatus which detects a predetermined abnormal condition, and the predetermined detecting signal is input from the detecting apparatus.

* * * * *